(12) United States Patent
Haustein et al.

(10) Patent No.: US 8,938,417 B2
(45) Date of Patent: Jan. 20, 2015

(54) INTEGRITY CHECKING AND SELECTIVE DEDUPLICATION BASED ON NETWORK PARAMETERS

(71) Applicant: International Business Machines Corporation, Armonk, NY (US)

(72) Inventors: Nils Haustein, Soergenloch (DE); Harald Seipp, Mainz (DE); Ulf Troppens, Mainz (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/773,680

(22) Filed: Feb. 22, 2013

(65) Prior Publication Data
US 2014/0244598 A1  Aug. 28, 2014

(51) Int. Cl.
*G06F 17/00* (2006.01)
*G06F 17/30* (2006.01)

(52) U.S. Cl.
CPC .......... *G06F 17/30156* (2013.01); *G06F 17/00* (2013.01)
USPC ........... 707/609; 707/640; 707/674; 707/828; 707/802; 707/822

(58) Field of Classification Search
CPC .......... G06F 17/00; G06F 17/30; G06F 11/00
USPC .................................. 707/600–899
See application file for complete search history.

(56) References Cited

U.S. PATENT DOCUMENTS

| | | | |
|---|---|---|---|
| 8,050,251 B2 | 11/2011 | Ongole et al. | |
| 2004/0136533 A1 | 7/2004 | Takagaki et al. | |
| 2011/0058474 A1 | 3/2011 | Nagapudi et al. | |
| 2011/0066666 A1 | 3/2011 | Takaoka et al. | |
| 2011/0145920 A1* | 6/2011 | Mahaffey et al. | 726/22 |
| 2011/0176556 A1 | 7/2011 | Guo et al. | |
| 2011/0273982 A1 | 11/2011 | Akirav et al. | |
| 2012/0016845 A1 | 1/2012 | Bates | |

OTHER PUBLICATIONS

Morita Daiki et al.; "An Effective Method of Transferring VM Disk Images Composing a Virtual Cluster", IPSJ SIG Technical Report, Jun. 15, 2012; vol. 2012—ARC-200, No. 10; pp. 1-9.

(Continued)

*Primary Examiner* — Isaac M Woo
(74) *Attorney, Agent, or Firm* — Schmeiser, Olsen & Watts; John Pivnichny

(57) ABSTRACT

An approach for managing a data package is provided. Network utilization is determined to exceed a threshold. A sender computer determines a hash digest of the data package by using a hash function selected based on central processing unit utilization. If the hash digest is in a sender hash table, then without sending the data package, the sender computer sends the hash digest and an index referring to the hash digest so that a recipient computer can use the index to locate a matching hash digest and the data package in a recipient hash table. If the hash digest is not in the sender hash table, then the sender computer adds the data package and the hash digest to the sender hash table and sends the data package and the hash digest to the second computer to check the integrity of the data package based on the hash digest.

20 Claims, 6 Drawing Sheets

(56) References Cited

OTHER PUBLICATIONS

Shiori Toyoshima et al.; "A Proposal of Storage ARchitecture on the Cloud", IPSJ SIG Technical Report, Apr. 18, 2013; vol. 2013—ARC-205, No. 2; pp. 1-8.

PCT International Search Report dated Mar. 4, 2014; International Application No. PCT/IB2013/060969; Filing Date Dec. 16, 2013; Applicant's File Reference DE920120048; 9 pages.

* cited by examiner

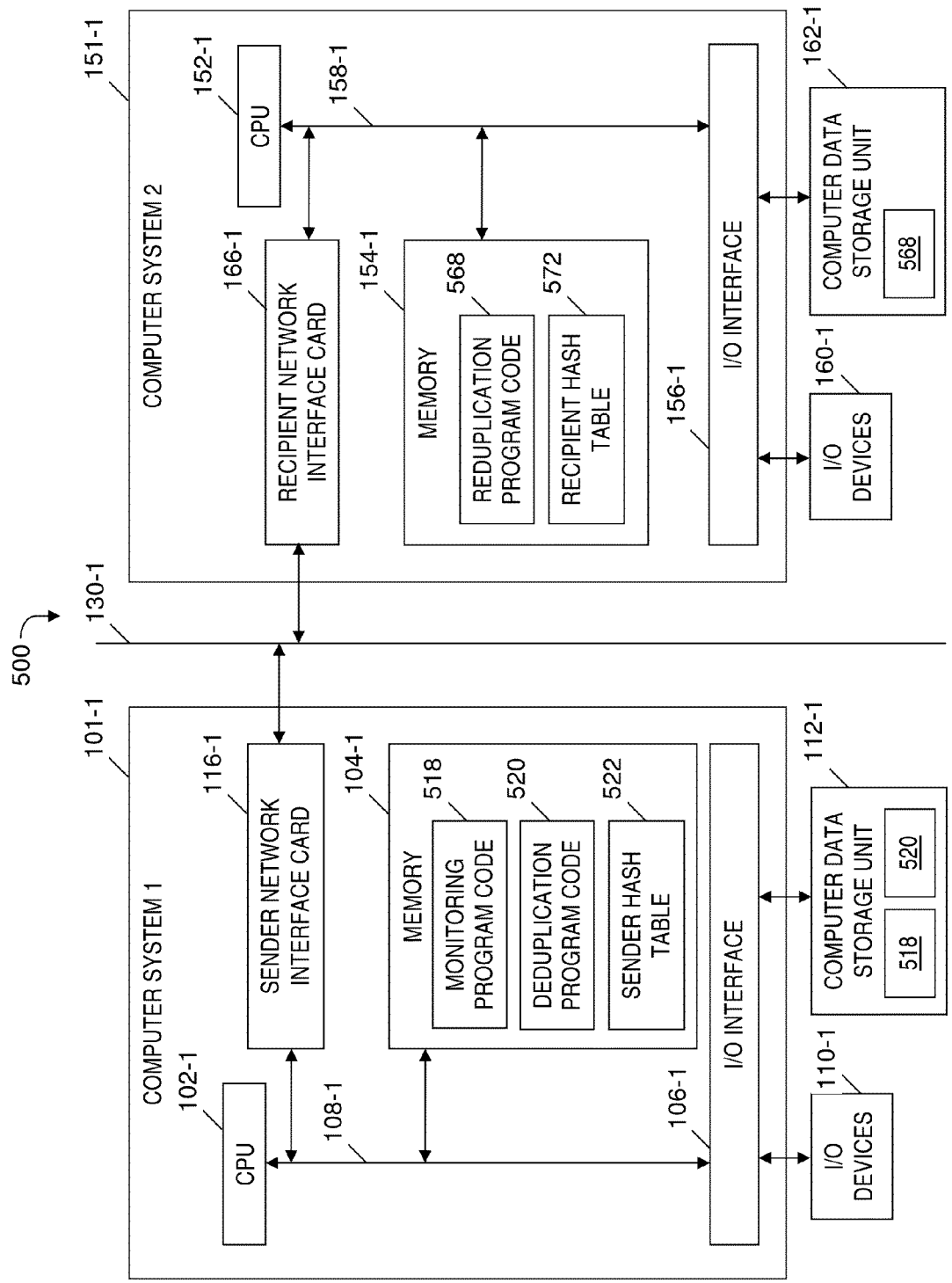

INTEGRITY CHECKING AND SELECTIVE DEDUPLICATION BASED ON NETWORK PARAMETERS

TECHNICAL FIELD

The present invention relates to a data processing method and system for managing communications traffic, and more particularly to a technique for performing integrity checking and selective deduplication on a stream of message packets.

BACKGROUND

A cryptographic hash function is an algorithm that takes an arbitrary block of data as input and generates and returns a hash digest (also known as (a.k.a.) a hash value, cryptographic hash value, or digest), which is a fixed-size bit string. A cryptographic hash function generates the hash digest so that an accidental or intentional change to the input data will, with a very high probability, change the hash digest. Furthermore, a cryptographic hash function is an avalanche function because a substantially small difference (e.g., even a difference of one bit) in the input to the function results in a substantially large (i.e., highly non-linear) difference in the digest. Cryptographic hash functions include Secure Hash Algorithm (SHA) functions and Message Digest (MD) functions. Examples of cryptographic hash functions and the size of their respective hash digests are included in Table 1.

TABLE 1

| Cryptographic Hash Function | Size(s) of Hash Digest (bits) |
| --- | --- |
| GOST | 256 |
| HAVAL | 256/224/192/160/128 |
| MD2 | 128 |
| MD4 | 128 |
| MD5 | 128 |
| PANAMA | 256 |
| RadioGatún | Up to 19 words |
| RACE Integrity Primitives Evaluation Message Digest (RIPEMD) | 128 |
| RIPEMD-128/256 | 128/256 |
| RIPEMD-160/320 | 160/320 |
| SHA-0 | 160 |
| SHA-1 | 160 |
| SHA-256/224 | 256/224 |
| SHA-512/384 | 512/384 |
| Tiger(2)-192/160/128 | 192/160/128 |
| WHIRLPOOL | 512 |

Network communication devices use communication protocols to send communication (i.e., data) packages from a sending network device (i.e., sender) to a receiving network device (i.e., receiver or recipient). According to known communication protocols, such as Transmission Control Protocol over Internet Protocol (TCP/IP), Fibre Channel over Ethernet (FCoE), Small Computer System Interface (SCSI), Internet SCSI (iSCSI), Serial-Attached-SCSI (SAS), Infiniband, and Ethernet, communication packages include fields for metadata and payload data. The metadata and payload data fields are defined by protocol standards according to the Open Systems Interconnection (OSI) network layer model. Certain metadata fields are used to store a checksum of the payload data, which allows performing integrity checking. The sending network device calculates and adds the checksum to the metadata, and sends the payload data and the metadata that includes the checksum to the receiving network device. After receiving the payload data and the metadata that includes the checksum, the receiving network device calculates the checksum of the received payload data and compares the result against the checksum included in the received metadata to guarantee data integrity. Known checksums are based on cyclic codes such as a Cyclic Redundancy Check (CRC).

SUMMARY

In a first embodiment, the present invention provides a method of managing a data package. The method includes a first computer determining a utilization of a network is greater than a network utilization threshold. The network includes the first computer and a second computer. The method further includes, based on the utilization of the network being greater than the network utilization threshold, the first computer entering a deduplication mode and subsequently performing steps in the deduplication mode. The steps in the deduplication mode include the first computer sending a notification to the second computer that the first computer has entered the deduplication mode. The steps in the deduplication mode further include the first computer determining whether a utilization of a central processing unit (CPU) included in the first computer is greater than a CPU utilization threshold. The steps in the deduplication mode further include the first computer selecting a first hash function instead of a second hash function if the utilization of the CPU is greater than the CPU utilization threshold. The steps in the deduplication mode further include the first computer selecting the second hash function instead of the first hash function if the utilization of the CPU is less than or equal to the CPU utilization threshold. The steps in the deduplication mode further include the first computer determining a hash digest of the data package by utilizing the selected first or second hash function. The steps in the deduplication mode further include the first computer determining whether the hash digest is in a sender hash table coupled to the first computer. The steps in the deduplication mode further include if the hash digest is in the sender hash table, then without the first computer sending the data package to the second computer, the first computer sending to the second computer the hash digest, an index referring to the hash digest in the sender hash table and in a recipient hash table coupled to the second computer, and optionally an identifier of the selected first or second hash function. The steps in the deduplication mode further include if the hash digest is not in the sender hash table, then the first computer adding the data package and the hash digest to the sender hash table and sending the data package, the hash digest, and the identifier of the selected first or second hash function to the second computer to determine whether the data package has integrity based on the hash digest.

In a second embodiment, the present invention provides a first computer system including a central processing unit (CPU); a memory coupled to the CPU; a computer-readable, tangible storage device coupled to the CPU, the storage device containing instructions that are carried out by the CPU via the memory to implement a method of managing a data package. The method includes the first computer system determining a utilization of a network is greater than a network utilization threshold. The network includes the first computer system and a second computer system. The method further includes, based on the utilization of the network being greater than the network utilization threshold, the first computer system entering a deduplication mode and subsequently performing steps in the deduplication mode. The steps in the deduplication mode include the first computer system sending a notification to the second computer system that the first computer system has entered the deduplication mode. The steps in the deduplication mode further include the first computer system determining whether a utilization of the CPU included in the first computer system is greater than a CPU utilization threshold. The steps in the deduplication mode further include the first computer system selecting a first hash function instead of a second hash function if the utilization of the CPU is greater than the CPU utilization threshold. The steps in the deduplication mode further include the first computer selecting the second hash function instead of the first hash function if the utilization of the CPU is less than or equal to the CPU utilization threshold. The steps in the deduplication mode further include the first computer system determining a hash digest of the data package by utilizing the selected first or second hash function. The steps in the deduplication mode further include the first computer system determining whether the hash digest is in a sender hash table coupled to the first computer system. The steps in the deduplication mode further include if the hash digest is in the sender hash table, then without the first computer system sending the data package to the second computer system, the first computer system sending to the second computer system the hash digest, an index referring to the hash digest in the sender hash table and in a recipient hash table coupled to the second computer system, and optionally an identifier of the selected first or second hash function. The steps in the deduplication mode further include if the hash digest is not in the sender hash table, then the first computer system adding the data package and the hash digest to the sender hash table and sending the data package, the hash digest, and the identifier of the selected first or second hash function to the second computer system to determine whether the data package has integrity based on the hash digest.

In a third embodiment, the present invention provides a computer program product including a computer-readable, tangible storage device; and a computer-readable program code stored in the computer-readable, tangible storage device. The computer-readable program code contains instructions that are carried out by a CPU of a first computer system to implement a method of managing a data package. The method includes the first computer system determining a utilization of a network is greater than a network utilization threshold. The network includes the first computer system and a second computer system. The method further includes, based on the utilization of the network being greater than the network utilization threshold, the first computer system entering a deduplication mode and subsequently performing steps in the deduplication mode. The steps in the deduplication mode include the first computer system sending a notification to the second computer system that the first computer system has entered the deduplication mode. The steps in the deduplication mode further include the first computer system determining whether a utilization of the CPU included in the first computer system is greater than a CPU utilization threshold. The steps in the deduplication mode further include the first computer system selecting a first hash function instead of a second hash function if the utilization of the CPU is greater than the CPU utilization threshold. The steps in the deduplication mode further include the first computer system selecting the second hash function instead of the first hash function if the utilization of the CPU is less than or equal to the CPU utilization threshold. The steps in the deduplication mode further include the first computer system determining a hash digest of the data package by utilizing the selected first or second hash function. The steps in the deduplication mode further include the first computer system determining whether the hash digest is in a sender hash table coupled to the first computer system. The steps in the deduplication mode further include if the hash digest is in the sender hash table, then without the first computer system sending the data package to the second computer system, the first computer system sending to the second computer system the hash digest, an index referring to the hash digest in the sender hash table and in a recipient hash table coupled to the second computer system, and optionally an identifier of the selected first or second hash function. The steps in the deduplication mode further include if the hash digest is not in the sender hash table, then the first computer system adding the data package and the hash digest to the sender hash table and sending the data package, the hash digest, and the identifier of the selected first or second hash function to the second computer system to determine whether the data package has integrity based on the hash digest.

In a fourth embodiment, the present invention provides a process for supporting computing infrastructure. The process includes providing at least one support service for at least one of creating, integrating, hosting, maintaining, and deploying computer-readable code in a first computer system. The computer-readable code contains instructions that, when carried out by a processor of the first computer system, implement a method of managing a data package. The method includes the first computer system determining a utilization of a network is greater than a network utilization threshold. The network includes the first computer system and a second computer system. The method further includes, based on the utilization of the network being greater than the network utilization threshold, the first computer system entering a deduplication mode and subsequently performing steps in the deduplication mode. The steps in the deduplication mode include the first computer system sending a notification to the second computer system that the first computer system has entered the deduplication mode. The steps in the deduplication mode further include the first computer system determining whether a utilization of the CPU included in the first computer system is greater than a CPU utilization threshold. The steps in the deduplication mode further include the first computer system selecting a first hash function instead of a second hash function if the utilization of the CPU is greater than the CPU utilization threshold. The steps in the deduplication mode further include the first computer system selecting the second hash function instead of the first hash function if the utilization of the CPU is less than or equal to the CPU utilization threshold. The steps in the deduplication mode further include the first computer system determining a hash digest of the data package by utilizing the selected first or second hash function. The steps in the deduplication mode further include the first computer system determining whether the hash digest is in a sender hash table coupled to the first computer system. The steps in the deduplication mode further include if the hash digest is in the sender hash table, then without the first computer system sending the data package to the second computer system, the first computer system sending to the second computer system the hash digest, an index referring to the hash digest in the sender hash table and in a recipient hash table coupled to the second computer system, and optionally an identifier of the selected first or second hash function. The steps in the deduplication mode further include if the hash digest is not in the sender hash table, then the first computer system adding the data package and the hash digest to the sender hash table and sending the data package, the hash digest, and the identifier of the selected first or second hash function to the second computer system to determine whether the data package has integrity based on the hash digest.

In a fifth embodiment, the present invention provides a method of managing a data package. The method includes a second computer performing steps in a reduplication mode. The steps in the reduplication mode are performed subsequent to a determination of a utilization of a network is greater than a network utilization threshold, the network including a first computer and the second computer; an entering of a deduplication mode by the first computer; a notification of the second computer by the first computer that the first computer has entered the deduplication mode; a determination by a first computer whether a utilization of a CPU included in the first computer is greater than a CPU utilization threshold; a selection of a first hash function instead of a second hash function if the utilization of the CPU is greater than the CPU utilization threshold; a selection of the second hash function instead of the first hash function if the utilization of the CPU is less than or equal to the CPU utilization threshold, wherein a utilization of the first hash function uses the CPU less than a utilization of the second hash function; a determination of a hash digest of the data package by a utilization of the selected first or second hash function; a determination that the hash digest is in a sender hash table coupled to the first computer; and a sending by the first computer to the second computer of the hash digest, an index referring to the hash digest in the sender hash table and in a recipient hash table coupled to the second computer, and an identifier of the selected first or second hash function, without a sending of the data package to the second computer. The steps in the reduplication mode include, based on the notification of the second computer by the first computer that the first computer has entered the deduplication mode, the second computer determining the data package is not received along with the hash digest, the index, and the identifier. The steps in the reduplication mode further include the second computer receiving the hash digest, the index referring to the hash digest in the sender hash table and in the recipient hash table, and the identifier of the selected first or second hash function. The steps in the reduplication mode further include, in response to the second computer determining the data package is not received and based on the index, the second computer locating the hash digest in the recipient hash table. The steps in the reduplication mode further include the second computer determining the hash digest located in the recipient hash table matches the received hash digest. The steps in the reduplication mode further include, based on the located hash digest matching the received hash digest, the second computer retrieving the data package associated with the located hash digest from the recipient hash table. The steps in the reduplication mode further include, based on the received identifier, the second computer determining the selected first or second hash function and determining a new hash digest by utilizing the selected first or second hash function on the retrieved data package. The steps in the reduplication mode further include, the second computer determining whether the new hash digest matches the received hash digest. The steps in the reduplication mode further include, if the new hash digest matches the received hash digest, the second computer passing the retrieved data package to an application.

In a sixth embodiment, the present invention provides a method of managing a data package. The method includes a first computer determining a first utilization of a network is less than or equal to a network utilization threshold. The network includes the first computer and a second computer. The method further includes, based on the utilization of the network being less than or equal to the network utilization threshold, the first computer performing steps without being in a deduplication mode. The steps without being in the deduplication mode include the first computer determining whether a utilization of a CPU included in the first computer is greater than a CPU utilization threshold. The steps without being in the deduplication mode include the first computer selecting a first hash function instead of a second hash function if the utilization of the CPU is greater than the CPU utilization threshold. The steps without being in the deduplication mode further include the first computer system selecting the second hash function instead of the first hash function if the utilization of the CPU is less than or equal to the CPU utilization threshold. The steps without being in the deduplication mode further include the first computer determining a hash digest of the data package by utilizing the selected first or second hash function. The method further includes, based on the first computer performing the steps without being in deduplication mode, the first computer adding the hash digest to a sender hash table coupled to the first computer, and the first computer sending the data package, the hash digest, and an identifier of the selected first or second hash function to the second computer to determine whether the data package has integrity based on the hash digest. A result of the first computer sending the data package, the hash digest and the identifier of the selected first or second hash function to the second computer includes a receipt by the second computer of the data package, the hash digest, and the identifier of the selected first or second hash function. The result of the first computer sending the data package, the hash digest and the identifier of the selected first or second hash function to the second computer further includes, based on the received identifier of the selected first or second hash function, a determination of a new hash digest by a utilization of the selected first or second hash function on the received data package. The result of the first computer sending the data package, the hash digest and the identifier of the selected first or second hash function to the second computer further includes a determination of whether the received hash digest matches the new hash digest. If the received hash digest matches the new hash digest, then the result of the first computer sending the data package, the hash digest and the identifier includes a determination that data package has integrity, an addition of the data package and the hash digest to a recipient hash table coupled to the second computer, and a passing of the data package to an application. If the received hash digest does not match the new hash digest, then the result of the first computer sending the data package, the hash digest and the identifier includes a notification of the first computer that the data package does not have integrity, and in response, a re-sending by the first computer of the data package and the hash digest to the second computer. The method further includes, subsequent to the step of sending the data package, the hash digest and the identifier of the selected first or second hash function to the second computer, the first computer determining a second utilization of a network is greater than the network utilization threshold. The method further includes, based on the utilization of the network being greater than the network utilization threshold, the first computer entering the deduplication mode and subsequently performing steps in the deduplication mode. The steps in the deduplication mode include the first computer notifying the second computer that the first computer has entered the deduplication mode. The steps in the deduplication mode further include the first computer determining a second hash digest of a second data package by utilizing the selected first or second hash function. The steps in the deduplication mode include the first computer determining the second hash digest of the second data package matches the hash digest added to the sender hash table. The steps in the deduplication mode further include, based on the second hash digest of the second data package matching the hash digest added to the sender hash table, and without the first computer sending the data package to the second computer, the first computer sending to the second computer the second hash digest, an index referring to the hash digest added to the sender hash table, and the identifier of the selected first or second hash function. A result of the first computer sending to the second computer the second hash digest, the index, and the identifier includes, based on the second computer being notified that the first computer has entered the deduplication mode, a determination by the second computer that the data package is not received along with the second hash digest, the index, and the identifier. A result of the first computer sending to the second computer the second hash digest, the index, and the identifier further includes a receipt by the second computer of the second hash digest, the index, and the identifier of the selected first or second hash function. A result of the first computer sending to the second computer the second hash digest, the index, and the identifier further includes, in response to the determination that the data package is not received and based on the index, a location by the second computer of the hash digest added to the recipient hash table. A result of the first computer sending to the second computer the second hash digest, the index, and the identifier further includes a determination by the second computer that the hash digest located in the recipient hash table matches the received second hash digest. A result of the first computer sending to the second computer the second hash digest, the index, and the identifier further includes, based on the hash digest located in the recipient hash table matching the received second hash digest, a retrieval by the second computer of the data package associated with the hash digest located in the recipient hash table. A result of the first computer sending to the second computer the second hash digest, the index, and the identifier further includes, based on the receipt of the identifier, a determination of the selected first or second hash function by the second computer, and a determination of a second new hash digest by a utilization by the second computer of the selected first or second hash function on the retrieved data package associated with the hash digest located in the recipient hash table. A result of the first computer sending to the second computer the second hash digest, the index, and the identifier further includes a determination by the second computer of whether the second new hash digest matches the received second hash digest. A result of the first computer sending to the second computer the second hash digest and the index further includes, if the second new hash digest matches the received second hash digest, a passing by the second computer of the retrieved data package to an application.

Embodiments of the present invention apply cryptographic hash functions to embed hash digests in communications traffic to provide data integrity checking and data deduplication when network utilization reaches or exceeds a utilization threshold. By providing data deduplication, embodiments of the present invention reduce the amount of data transferred between sending and receiving network devices.

BRIEF DESCRIPTION OF THE DRAWINGS

FIG. 5 is a block diagram of a computer system that is included in an alternate embodiment of the system of FIG. 1 and that implements the processes of FIGS. 2A-2B and FIG. 3, in accordance with embodiments of the present invention.

DETAILED DESCRIPTION

Overview

Embodiments of the present invention reduce the amount of data transferred between sending and receiving network devices by applying cryptographic hash functions to communications traffic in a network to provide selective data deduplication of the communications traffic in response to determining that network utilization or throughput is greater than a user-defined threshold. The cryptographic hash functions applied to the communications traffic also provide checksums for data integrity checking.

System for Managing a Data Packet

Figure 1:
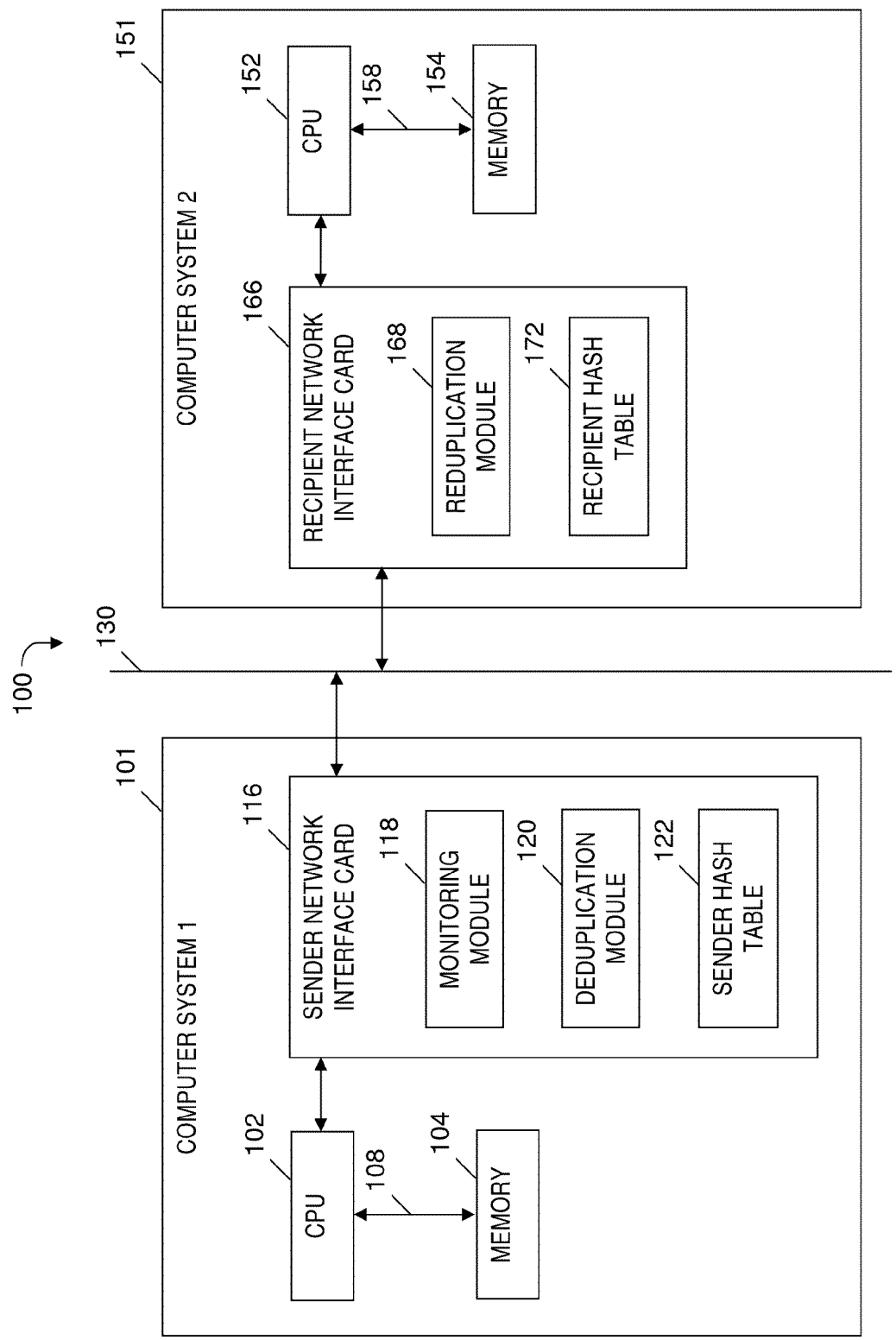
FIG. 1 is a block diagram of a system for managing a data package, in accordance with embodiments of the present invention.

FIG. 1 is a block diagram of a system for managing a data package, in accordance with embodiments of the present invention. A system 100 includes a first computer system 101, which includes a central processing unit (CPU) 102, a memory 104, a bus 108, and a sender network interface card (NIC) 116, which connects first computer system 101 to a computer network 130. First computer system 101 also includes an input/output interface (not shown) coupled to CPU 102 via bus 108. Sender network interface card 116 is a NIC that is extended by embodiments of the present invention to include a software-based monitoring module 118, a software-based deduplication module 120 and a sender hash table 122.

First computer system 101 communicates via computer network 130 with one or more computer systems, including a second computer system 151. First computer system 101 is a sender computer system that processes requests to send data packages to one or more other, recipient computer systems connected to network 130, including second computer system 151. First computer system 101 runs an operating system (not shown) and one or more software applications (not shown). One of the applications initiates sending data over network 130, which includes the application instructing the operating system to send the data, and in response, the operating system instructs sender NIC 116 to send the data over network 130.

Second computer system 151 includes a CPU 152, a memory 154, a bus 158, and a recipient network interface card 166, which connects second computer system 151 to network 130. Second computer system 151 also includes an input/output interface (not shown) coupled to CPU 152 via bus 158. Recipient network interface card 166 is a NIC that is extended by embodiments of the present invention to include a software-based reduplication module 168 and a recipient hash table 172. Communication traffic in network 130 includes communication packages sent by sender NIC 116 to recipient NIC 166.

Although first computer system 101 is described herein as sending a communication package from NIC 116 and second computer system 151 is described herein as receiving the communication package at NIC 166, those skilled in the art will appreciate that embodiments of the present invention include NIC 166 being the sending device and NIC 116 being the receiving device.

Sender hash table 122 and recipient hash table 172 include data entries having respective indexes, respective hash digests, respective data packages and respective usage counts. A particular index in sender hash table 122 or recipient hash table 172 refers to a particular data package, a particular hash digest generated by applying a hash function to the data package, and a particular usage count. In one embodiment, an index in sender hash table 122 or recipient hash table 172 is a row number indicating the row of sender hash table 122 (see FIG. 1) or recipient hash table 172 that includes a particular data package, hash digest, and usage count. The usage count indicates how many times first computer system 101 processed request(s) to send the data package to respective recipient computer system(s) connected to network 130, such as second computer system 151. As system 100 operates, the content of sender hash table 122 matches the content of recipient hash table 172, or sender hash table 122 has a new row of data that has not yet been, but will be, added to recipient hash table 172. The management of available space in sender hash table 122 and available space in recipient hash table 172 is discussed below relative to FIG. 3.

In one embodiment, each row in sender hash table 122 and recipient hash table 172 include a row number, hash digest, data package and usage count, as is illustrated in the example presented in Table 2. In Table 2, the first column includes the number of the row that is incremented by one for each new row. The second column of Table 2 includes the hash digest for the data package in the third column. The fourth column of Table 2 includes the usage count, which indicates how often the data package has been sent by a computer system connected to network 130.

TABLE 2

| Row number | Hash digest | Data package | Usage count |
| --- | --- | --- | --- |
| 1 | 348c5427e5871c2e623d823fe6cea727 | "Hello world, mistakes are there to be made" | 2 |
| 2 | d10aab8578995627556d54651b0b962d | "Nothing is impossible" | 1 |

Figure 2A:
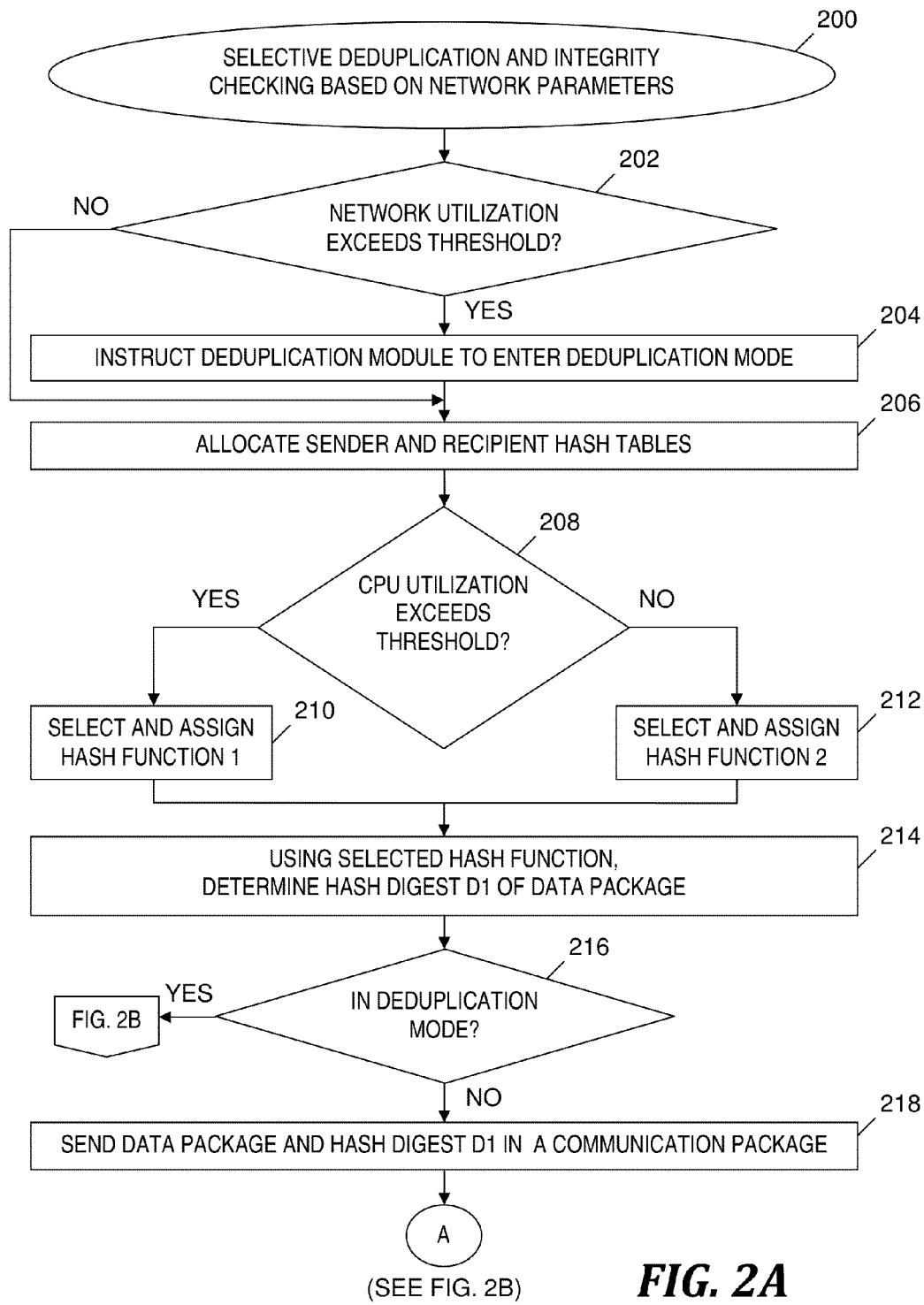
FIGS. 2A-2B depict a flowchart of a process of managing a data package in the system of FIG. 1, in accordance with embodiments of the present invention.
Figure 2B:
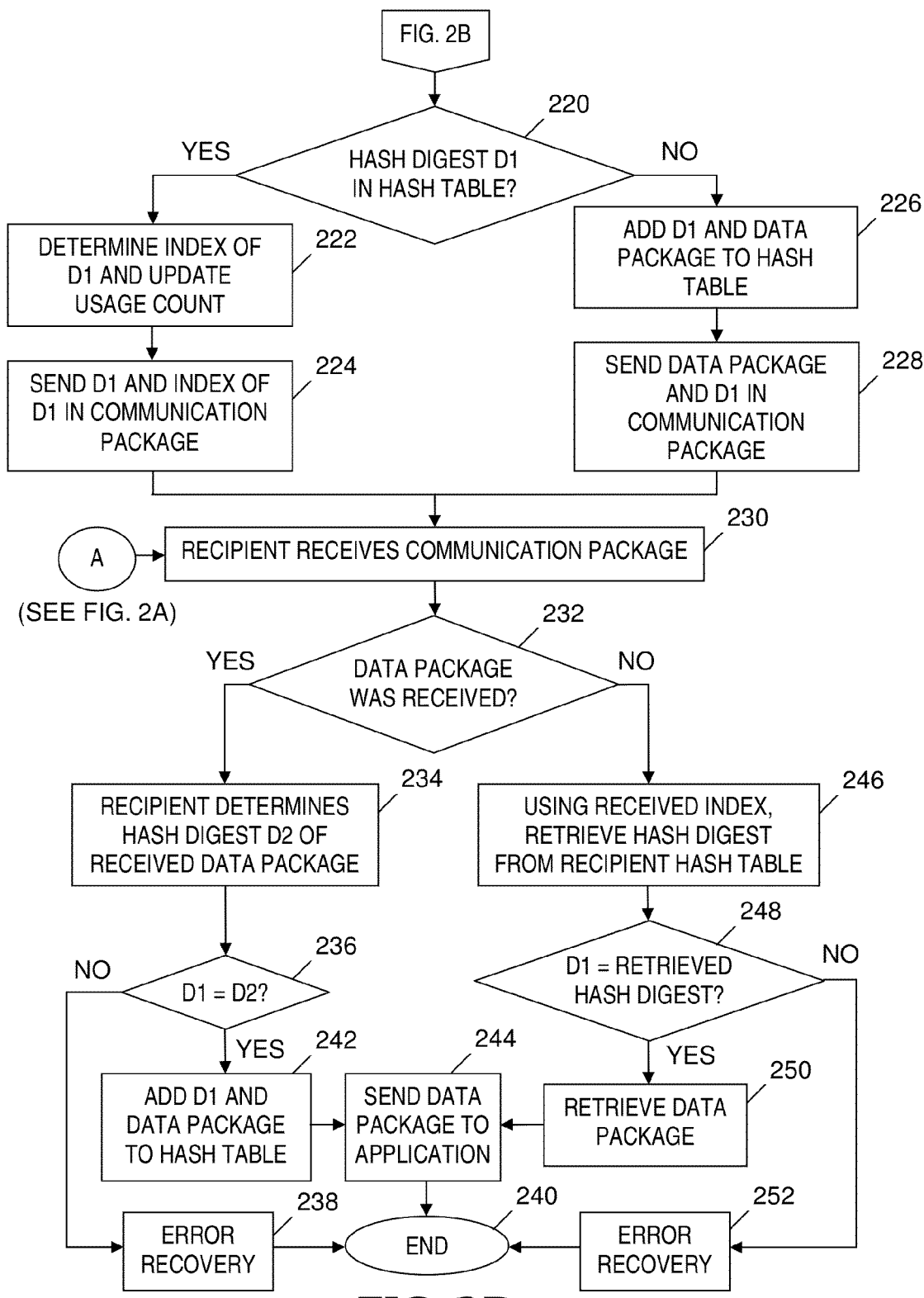

If monitoring module 118 determines that a utilization of network 130 exceeds a user-defined network utilization threshold value, first computer system 101 enters a deduplication mode, which includes steps performed by deduplication module 120. Some of the steps in the deduplication mode are described in this section. Steps in the deduplication mode and steps performed outside of the deduplication mode are described in detail in the discussion of FIGS. 2A-2B, presented below.

While in deduplication mode, first computer system 101 receives and processes a request to send a data package to a software application being executed by second computer system 151 or another computer system (not shown) connected to network 130. First computer system 101 applies a hash function to determine a hash digest of the data package. If the hash digest is already in sender hash table 122, then first computer system 101 sends the hash digest and the index of the hash digest to second computer system 151. Reduplication module 168 uses the received index to locate and retrieve the data package from recipient hash table 172, without having the data package sent by first computer system 101 to second computer system 151 via network 130. By not having the data package sent across network 130, the amount of data sent via network 130 is reduced.

If the hash digest is not already in sender hash table 122, then first computer system 101 adds the hash digest and the data package to sender hash table 122, and sends the hash digest and the data package to second computer system 151. Reduplication module 168 determines a new hash digest of the received data package and uses a comparison of the new hash digest and the received hash digest as a data integrity check of the received data package.

Again, it should be noted that the details of the steps performed in the deduplication mode are described below in the discussion of FIGS. 2A-2B.

The functionality of the components of FIG. 1 is described in more detail in the discussions presented below relative to FIGS. 2A-2B and FIG. 3, and in the section entitled Computer System. In an alternate embodiment, computer system 101 also includes a reduplication module (not shown) whose functionality matches the functionality of reduplication module 168, and computer system 151 includes a monitoring module (not shown) and deduplication module (not shown) whose functionality matches the functionality of monitoring module 118 and deduplication module 120, respectively. In this alternate embodiment, the reduplication module in computer system 101 (see FIG. 1) performs the steps in FIGS. 2A-2B that are described below as being performed by reduplication module 168 (see FIG. 1); the monitoring module in computer system 151 (see FIG. 1) performs the steps in FIGS. 2A-2B and in FIG. 3 that are described below as being performed by monitoring module 118 (see FIG. 1); and the deduplication module in computer system 151 (see FIG. 1) performs the steps in FIGS. 2A-2B that are described below as being performed by deduplication module 120 (see FIG. 1).

Process for Managing a Data Packet

FIGS. 2A-2B depict a flowchart of a process of managing a data packet in the system of FIG. 1, in accordance with embodiments of the present invention. In the discussion of FIGS. 2A-2B presented below, any step described as being performed by monitoring module 118 (see FIG. 1) is performed by computer system 101 (see FIG. 1) executing program code included in monitoring module 118 (see FIG. 1); any step described as being performed by deduplication module 120 (see FIG. 1) is performed by computer system 101 (see FIG. 1) executing program code included in deduplication module 120 (see FIG. 1); and any step described as being performed by reduplication module 168 (see FIG. 1) is performed by computer system 151 (see FIG. 1) executing program code included in reduplication module 168 (see FIG. 1).

The process of FIGS. 2A-2B starts at step 200, with first computer system 101 (see FIG. 1) receiving or generating a request to send a data package to second computer system 151 (see FIG. 1). Prior to step 202, first computer system 101 (see FIG. 1) receives a network utilization threshold value, which indicates a maximum utilization of network 130 (see FIG. 1) that is permitted to be associated with sending data packages from first computer system 101 (see FIG. 1) to second computer system 151 (see FIG. 1) without being in deduplication mode. Utilization of network 130 is a measurement of the number of data packages transmitted over network 130 (see FIG. 1) per unit of time. The network utilization threshold value may be a default value or a user-defined value. In one embodiment, the network utilization threshold is a percentage of the maximum throughput of network 130 (see FIG. 1), which is based on the topology of network 130 (see FIG. 1) and the particular technology employed by network 130 (see FIG. 1).

In step 202 monitoring module 118 (see FIG. 1) determines whether a utilization of network 130 (see FIG. 1) (i.e., network utilization) is greater than the network utilization threshold value. If monitoring module 118 (see FIG. 1) determines in step 202 that the network utilization is greater than the network utilization threshold, then the Yes branch of step 202 is taken and step 204 is performed. If monitoring module 118 (see FIG. 1) determines in step 202 that the network utilization is less than or equal to the network utilization threshold, then the No branch of step 202 is taken and step 206 is performed next.

In an alternate embodiment, step 202 determines whether a measurement of throughput through network 130 (see FIG. 1) exceeds a throughput threshold value, and if the throughput exceeds the threshold, then step 204 is performed; otherwise, step 206 is performed next.

In step 204, monitoring module 118 (see FIG. 1) instructs deduplication module 120 (see FIG. 1) to enter a deduplication mode if deduplication module 120 (see FIG. 1) is not already in deduplication mode. In response, and if deduplication module 120 (see FIG. 1) is not already in deduplication mode, deduplication module 120 (see FIG. 1) enters the deduplication mode. In one embodiment, steps 206-218 in FIG. 2A and steps 220-228 in FIG. 2B are performed by computer system 101 (see FIG. 1) in the deduplication mode. After instructing the deduplication module 120 (see FIG. 1) to enter a deduplication mode and prior to step 206, monitoring module 118 (see FIG. 1) sends a notification to reduplication module 168 (see FIG. 1) running in computer system 151 (see FIG. 1), where the notification informs computer system 151 (see FIG. 1) that deduplication module 120 (see FIG. 1) has entered the deduplication mode. Reduplication module 168 (see FIG. 1) receives the notification sent by monitoring module 118 (see FIG. 1).

Step 206 follows step 204 and the No branch of step 202. In step 206, deduplication module 120 (see FIG. 1) allocates sender hash table 122 (see FIG. 1) and reduplication module 168 (see FIG. 1) allocates recipient hash table 172 (see FIG. 1), in response to reduplication module 168 (see FIG. 1) receiving the aforementioned notification that deduplication module 120 (see FIG. 1) has entered the deduplication mode. If step 206 follows the No branch of step 202, the step 206 includes monitoring module 118 (see FIG. 1) instructing deduplication module 120 (see FIG. 1) to leave deduplication mode if deduplication module 120 (see FIG. 1) is already in deduplication mode. After instructing deduplication module 120 (see FIG. 1) to leave the deduplication mode, monitoring module 118 (see FIG. 1) sends a notification to reduplication module 168 (see FIG. 1) running in computer system 151 (see FIG. 1), where the notification informs computer system 151 (see FIG. 1) that deduplication module 120 (see FIG. 1) has left the deduplication mode. Reduplication module 168 (see FIG. 1) receives the notification sent by monitoring module 118 (see FIG. 1).

Prior to step 208, first computer system 101 (see FIG. 1) receives a CPU utilization threshold value that indicates a maximum current utilization of CPU 102 (see FIG. 1) that is permitted to exist when a second hash function is selected instead of a first hash function. Utilizing the first hash function on a data package to generate a hash digest uses less resources provided by CPU 102 (see FIG. 1) than utilizing the second hash function on the same data package to generate a hash digest. The second hash function, however, is stronger than the first hash function because the hash function generates a longer hash digest than the hash digest generated by the first hash function, and therefore utilizing the second hash function rather than the first hash function reduces the likelihood for hash collisions. Thus, utilizing the second hash function is favored over the first hash function when sufficient CPU capacity is available (i.e., CPU utilization is less than or equal to the CPU utilization threshold value). The CPU utilization threshold value may be a default value or a user-defined value. In step 208, monitoring module 118 (see FIG. 1) determines whether a utilization of CPU 102 (see FIG. 1) (i.e., CPU utilization) is greater than the CPU utilization threshold value. If monitoring module 118 (see FIG. 1) determines in step 208 that CPU utilization is greater than the CPU utilization threshold value, then the Yes branch of step 208 is taken and step 210 is performed.

In step 210, deduplication module 120 (see FIG. 1) selects the first hash function instead of a second hash function, and assigns the selected first hash function as the hash function to be used to determine a hash digest for the data package.

Returning to step 208, if monitoring module 118 (see FIG. 1) determines in step 208 that CPU utilization is less than or equal to the CPU utilization threshold value, then the No branch of step 208 is taken and step 212 is performed.

In step 212, deduplication module 120 (see FIG. 1) selects the second hash function instead of the first hash function. Deduplication module (see FIG. 1) assigns the selected second hash function as the hash function to be used to determine a hash digest for the data package.

Step 214 follows step 210 and step 212. In step 214, by using the first hash function selected in step 210 or the second hash function selected in step 212, deduplication module 120 (see FIG. 1) determines the hash digest D1 of the data package. Hereinafter, the hash function selected in either step 210 or step 212 is also referred to as the selected hash function.

In step 216, deduplication module 120 (see FIG. 1) determines whether deduplication mode has been entered in step 204. If deduplication module 120 (see FIG. 1) determines in step 216 that the deduplication mode has not been entered in step 204, then the No branch of step 216 is taken and step 218 is performed.

In step 218, deduplication module 120 (see FIG. 1) sends the data package, the hash digest D1, and an identifier of the selected hash function in a communication package to second computer system 151 (see FIG. 1) via network 130 (see FIG. 1). As one example, multiple hash functions such as the hash functions listed in Table 1, may be uniquely identified by respective numbers (e.g., the identifier of MD5 is 1, the identifier of SHA-256 is 2, and the identifier of WHIRLPOOL is 3). Step 230 in FIG. 2B follows step 218.

Returning to step 216, if deduplication module 120 (see FIG. 1) determines that the deduplication mode has been entered, then the Yes branch of step 216 is taken and the next step in the process of FIGS. 2A-2B is step 220 in FIG. 2B.

In step 220 in FIG. 2B, deduplication module 120 (see FIG. 1) determines whether the hash digest D1 is already in sender hash table 122 (see FIG. 1). For example, deduplication module 120 (see FIG. 1) attempts to match hash digest D1 to the second column of Table 2. If deduplication module 120 (see FIG. 1) determines in step 220 that the hash digest D1 is in sender hash table 122 (see FIG. 1), then the Yes branch of step 220 is taken and step 222 is performed.

In step 222, deduplication module 120 (see FIG. 1) determines an index that refers to the hash digest D1 in sender hash table 122 (see FIG. 1), and deduplication module 120 (see FIG. 1) updates a usage count in an entry of sender hash table 122 (see FIG. 1), where the entry includes the index, the hash digest D1, the data package, and the usage count. In one embodiment, each time the data package is processed through the Yes branch of step 220 and step 222, deduplication module 120 (see FIG. 1) increments the usage count by 1. In one embodiment, the index determined in step 222 is a row number of sender hash table 122 (see FIG. 1).

In step 224, deduplication module 120 (see FIG. 1) generates a communication package that includes the hash digest D1 and the index referring to the hash digest D1 in sender hash table 122 (see FIG. 1), and optionally includes the identifier of the selected hash function, and sends the generated communication package to second computer system 151 (see FIG. 1). The data package is not included in the communication package generated in step 224. Step 230 follows step 224.

Returning to step 220, if deduplication module 120 (see FIG. 1) determines that the hash digest D1 is not in sender hash table 122 (see FIG. 1), then the No branch of step 220 is taken and step 226 is performed.

In step 226, deduplication module 120 (see FIG. 1) adds hash digest D1 and the data package into a new record (e.g., a new row), which is appended to sender hash table 122 (see FIG. 1). Deduplication module 120 (see FIG. 1) determines an index (e.g., a row number) that refers to the hash digest D1 and the data package that are added to sender hash table 122 (see FIG. 1) in step 226. Deduplication module 120 (see FIG. 1) also initializes the value of a usage count in the new record. For example, the initialized value of the usage count may be 1.

In step 228, deduplication module 120 (see FIG. 1) generates a communication package that includes the data package, the hash digest D1 embedded as metadata, and an identifier of the hash function selected in step 210 (see FIG. 2A) or step 212 (see FIG. 2A), and sends the generated communication package to second computer system 151 (see FIG. 1).

In step 230, which follows step 224 and step 228, reduplication module 168 (see FIG. 1) executing in second computer system 151 (see FIG. 1) receives the communication package generated in step 224 or step 228.

In step 232, reduplication module 168 (see FIG. 1) determines whether the communication package received in step 230 includes the data package. If reduplication module 168 (see FIG. 1) determines in step 232 that the communication package received in step 230 includes the data package sent in step 228 or 218 (see FIG. 2A), then the Yes branch of step 232 is taken and step 234 is performed. In one embodiment, reduplication module 168 (see FIG. 1) determines that the communication package received in step 230 does not include the data package based on reduplication module 168 (see FIG. 1) having received the notification in step 204 (see FIG. 2A) that deduplication module 120 (see FIG. 1) has entered the deduplication mode and based on reduplication module 168 (see FIG. 1) having received the communication package in step 230 that includes the hash digest D1, the index referring to the hash digest D1 in sender hash table 122 (see FIG. 1), and the identifier of the selected hash function.

Subsequent to step 232 and prior to step 234, reduplication module 168 (see FIG. 1) identifies the selected hash function using the identifier of the hash function included in the communication package received in step 230. In step 234, reduplication module 168 (see FIG. 1) determines a hash digest D2 by applying the identified hash function to the data package included in the communication package received in step 230.

In step 236, reduplication module 168 (see FIG. 1) determines whether the hash digest D1 included in the communication package received in step 230 equals hash digest D2, which indicates whether the received data package has data integrity. If reduplication module 168 (see FIG. 1) determines in step 236 that D1 does not equal D2, then reduplication module determines a lack of data integrity in the received data package, the No branch of step 236 is taken and step 238 is performed.

In step 238, an error recovery procedure is performed. The error recovery procedure includes reduplication module 168 (see FIG. 1) sending a message to first computer system 101 (see FIG. 1) indicating the data package lacks data integrity. In response to receiving the message about the lack of data integrity, first computer system 101 (see FIG. 1) generates another communication package to re-send the data package along with the hash digest D1 and the identifier of the selected hash function to second computer system 151 (see FIG. 1). The process of FIGS. 2A-2B ends at step 240. Although not shown, after first computer system 101 (see FIG. 1) re-sends the data package in step 238, hash digest D1 and the identifier of the selected hash function, steps 230, 232, 234, and 236 are repeated until step 236 determines that D1=D2, and the Yes branch of step 236 is taken, as described below. Upon repeating steps 230, 232, 234 and 236 and if D1 is not equal to D2, then the error recovery procedure in step 238 may be repeated.

Returning to step 236, if reduplication module 168 (see FIG. 1) determines that D1=D2, then the Yes branch of step 236 is taken and step 242 is performed.

In step 242, reduplication module 168 (see FIG. 1) determines that the received data package has data integrity and adds the received hash digest D1 and data package to a new record (e.g., a new row), which is appended to recipient hash table 172 (see FIG. 1). Thus the new record appended to recipient hash table 172 (see FIG. 1) in step 242 matches the new record appended to sender hash table 122 (see FIG. 1) in the most recent performance of step 226. After appending the new record to recipient hash table 172 (see FIG. 1), the contents of recipient hash table 172 (see FIG. 1) once again match the contents of sender hash table 122 (see FIG. 1).

In step 244, reduplication module 168 (see FIG. 1) sends the data package to the application that requested the data package. After step 244, the process of FIGS. 2A-2B ends at step 240.

Returning to step 232, if reduplication module 168 (see FIG. 1) determines that the communication package received in step 230 does not include the data package (i.e., the communication package having only the hash digest D1 and the index of D1 was sent in step 224), then the No branch of step 232 is taken and step 246 is performed.

In step 246, reduplication module 168 (see FIG. 1) looks up the index received in step 230 in recipient hash table 172 (see FIG. 1), and based on the lookup of the index, locates and retrieves a hash digest in an entry in recipient hash table 172 (see FIG. 1) that is referenced by the index.

In step 248, reduplication module 168 (see FIG. 1) determines whether the hash digest retrieved from recipient hash table 172 (see FIG. 1) in step 246 equals the hash digest D1, which was included in the communication package received in step 230. If reduplication module 168 (see FIG. 1) in step 248 determines the hash digest retrieved from recipient hash table 172 (see FIG. 1) equals the hash digest D1, then the Yes branch of step 248 is taken and step 250 is performed.

In step 250, reduplication module 168 (see FIG. 1) retrieves a data package from recipient hash table 172 (see FIG. 1), based on the data package being referenced by the index included in the communication package received in step 230. If the identifier of the selected hash function was sent in step 224 and was included in the communication package received in step 230, then step 250 also includes reduplication module 168 (see FIG. 1) performing the following steps: (1) based on the identifier of the selected hash function included in the communication package received in step 230, determine which hash function is the selected hash function; (2) determine a new hash digest by utilizing the selected hash function on the data package retrieved in step 250; and (3) determine whether the new hash digest matches the received hash digest.

In step 244, which follows step 250, and if the identifier of the selected hash function was not included in the communication package received in step 230, then reduplication module 168 (see FIG. 1) sends the data package to the application that requested the data package, where the data package being sent is the data package retrieved in step 250. In step 244, if the identifier of the selected hash function was included in the communication package received in step 230, and if the new hash digest determined in step 250 matches the hash digest included in the communication package received in step 230, then reduplication module 168 (see FIG. 1) sends the data package to the application that requested the data package, where the data package being sent is the data package retrieved in step 250. As described above, the data package is retrieved from the recipient hash table 172 (see FIG. 1) and sent to the application in response to only hash digest D1 and the index of D1 being sent in step 224 (i.e., without having the data package sent from first computer system 101 (see FIG. 1) to second computer system 151 (see FIG. 1) via network 130 (see FIG. 1) in step 224), thereby decreasing the amount of data sent via network 130 (see FIG. 1) as compared to known techniques that transmit and re-transmit a data package over a network in response to the same data package being requested multiple times. After step 244, the process of FIGS. 2A-2B ends at step 240.

Returning to step 248, if reduplication module 168 (see FIG. 1) determines the hash digest retrieved from recipient hash table 172 (see FIG. 1) in step 246 does not equal the hash digest D1, then the No branch of step 248 is taken and step 252 is performed.

In step 252, an error recovery procedure is performed. The error recovery procedure in step 252 includes reduplication module 168 (see FIG. 1) searching other entries of recipient hash table 172 (see FIG. 1) for a hash digest that matches the hash digest D1. If the result of this search is that reduplication module 168 (see FIG. 1) locates an entry in recipient hash table 172 (see FIG. 1) that includes a hash digest that matches hash digest D1, then reduplication module 168 (see FIG. 1) retrieves the data package that is in the located entry, sends the retrieved data package to the application that requested the data package, and moves the located entry in recipient hash table 172 (see FIG. 1) so that its index matches the index that had been included in the communication package received in step 230, thereby ending the error recovery procedure.

If the identifier of the selected hash function was included in the communication package received in step 230, then prior to sending the retrieved data package to the application, reduplication module 168 (see FIG. 1) optionally performs the following steps: (1) based on the identifier of the selected hash function included in the communication package received in step 230, determine which hash function is the selected hash function; (2) determine a new hash digest by utilizing the selected hash function on the retrieved data package; and (3) determine whether the new hash digest matches the received hash digest. Subsequently, if the new hash digest matches the received hash digest, reduplication module 168 (see FIG. 1) sends the retrieved data package to the application that requested the data package, and moves the located entry in recipient hash table 172 (see FIG. 1) so that its index matches the index that had been included in the communication package received in step 230, thereby ending the error recovery procedure.

If reduplication module 168 (see FIG. 1) cannot find an entry in recipient hash table 172 (see FIG. 1) that includes a hash digest equal to hash digest D1, then reduplication module 168 (see FIG. 1) sends a message to first computer system 101 (see FIG. 1) indicating the data package corresponding to hash digest D1 has not been found in recipient hash table 172 (see FIG. 1), thereby completing the error recovery procedure. After the error recovery procedure in step 252 is completed, the process of FIGS. 2A-2B ends at step 240.

In one embodiment, to process additional request(s) to send one or more other data packages from first computer system 101 (see FIG. 1) to second computer system 151 (see FIG. 1), the process of FIGS. 2A-2B repeats for each of the other data packages starting at step 214 (see FIG. 2A), and as long as network utilization continues to exceed the network utilization threshold, deduplication module 120 (see FIG. 1) remains in deduplication mode and there is no re-sending of the notification from computer system 101 (see FIG. 1) to computer system 151 (see FIG. 1) that deduplication module 120 (see FIG. 1) is in deduplication mode. In an alternate embodiment, the check of CPU utilization in step 208, and steps 210, 212 and 214 (see FIG. 2A) occur prior to the check of network utilization in step 202 (see FIG. 2A).

In an alternate embodiment, computer system 101-1 (see FIG. 5) executing monitoring program code 518 (see FIG. 5) performs steps 202, 204 and 208 (see FIG. 2A); computer system 101-1 (see FIG. 5) executing deduplication program code 520 (see FIG. 5) performs the allocation of sender hash table 122 (see FIG. 1) in step 206 (see FIG. 2A), steps 210, 212, 214, 216 and 218 (see FIG. 2A), and steps 220, 222, 224, 226 and 228 (see FIG. 2B). Furthermore, in the embodiment described in this paragraph, computer system 151 (see FIG. 1) executing reduplication program code 568 (see FIG. 5) performs the allocation of recipient hash table 172 (see FIG. 1) in step 206 (see FIG. 2A), and steps 230, 232, 234, 236, 238, 242, 244, 246, 248, 250 and 252 (see FIG. 2B).

Process for Managing Hash Table Space

Figure 3:
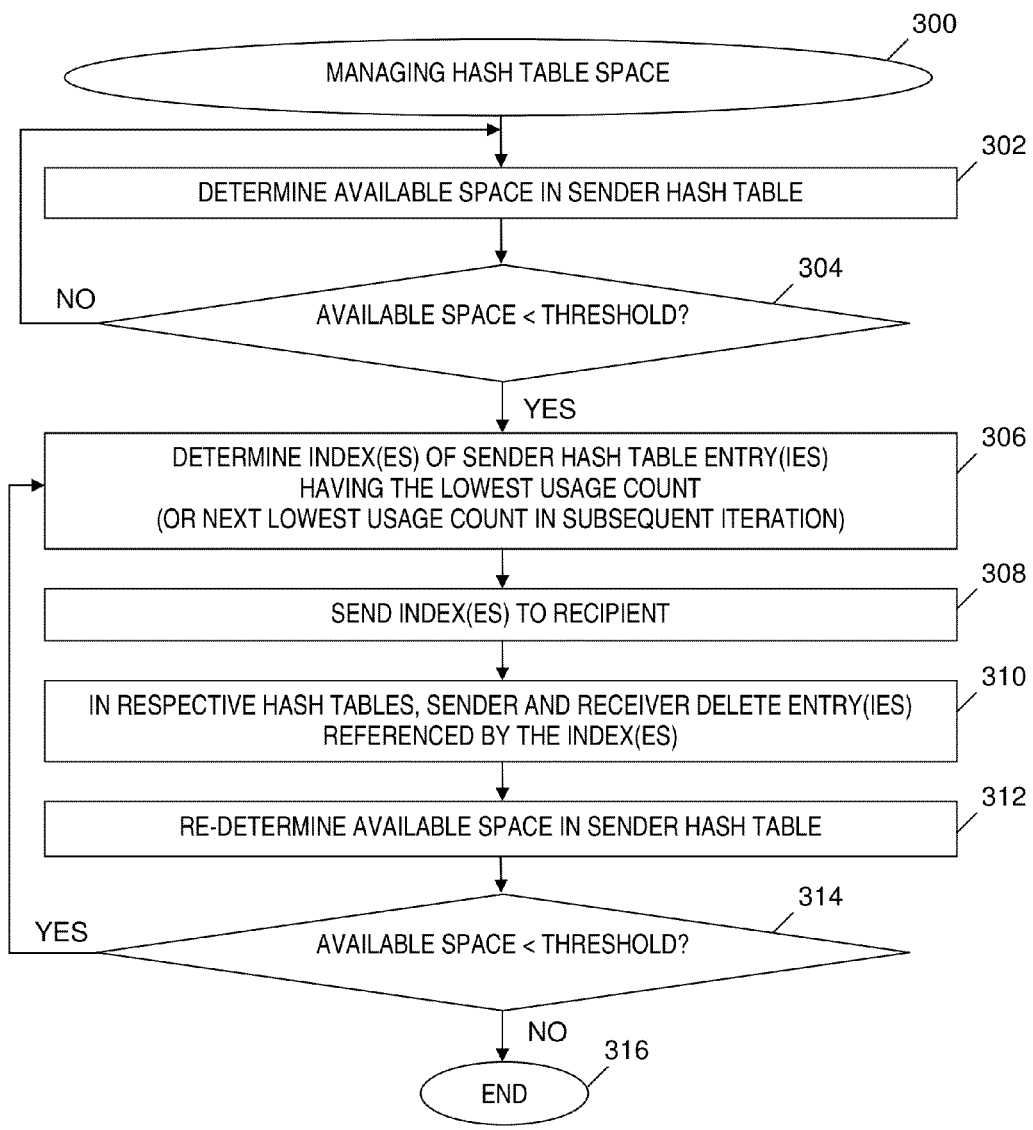
FIG. 3 is a flowchart of a process of managing hash table space in the system of FIG. 1, in accordance with embodiments of the present invention.

FIG. 3 is a flowchart of a process of managing hash table space in the system of FIG. 1, in accordance with embodiments of the present invention. In one embodiment, the process of FIG. 3 occurs periodically as the process of FIGS. 2A-2B is being repeated for multiple data packages while in deduplication mode. The process of FIG. 3 starts at step 300. In step 302, monitoring module 118 (see FIG. 1) determines the amount of space that is available (i.e., available space) in sender hash table 122 (see FIG. 1). Prior to step 304, monitoring module 118 (see FIG. 1) receives an available space threshold value that indicates how low the amount of available space in sender hash table 122 (see FIG. 1) can be without requiring a deletion of one or more entries in sender hash table 122 (see FIG. 1) to increase the available space.

In step 304, monitoring module 118 (see FIG. 1) determines whether the available space determined in step 302 is less than the available space threshold value. If monitoring module 118 (see FIG. 1) determines that the available space determined in step 302 is greater than or equal to the available space threshold value, then the No branch of step 304 is taken and the process of FIG. 3 loops back to step 302. If monitoring module 118 (see FIG. 1) determines that the available space determined in step 302 is less than the available space threshold value, then the Yes branch is taken and step 306 is performed. Alternatively, the receiver (i.e., computer system 151 in FIG. 1) checks the available space and if the available space drops below the threshold, then the receiver sends a message to the sender (i.e., computer system 101 in FIG. 1), which requests a cleanup of recipient hash table 172. After the aforementioned message is sent, the Yes branch of step 304 is taken.

In step 306, based on the available space in sender hash table 122 (see FIG. 1) being less than the available space threshold value, monitoring module 118 (see FIG. 1) determines index(es) (e.g., row numbers) of one or more entries in the sender hash table 122 (see FIG. 1) whose respective usage count(s) equal a lowest usage count or a next lowest usage count. In the first performance of step 306, monitoring module 118 (see FIG. 1) determines the index(es) of the entry(ies) in sender hash table 122 (see FIG. 1) that have a usage count equal to the lowest usage count, as compared to all other usage counts in sender hash table 122 (see FIG. 1). In a subsequent performance of step 306 resulting from the loop starting at the Yes branch of step 314 as described below, monitoring module 118 (see FIG. 1) determines index(es) of entry(ies) of sender hash table 122 (see FIG. 1) that have a usage count that equals the next lowest usage count relative to the particular usage count used in the most recent previous performance of step 306.

In step 308, monitoring module 118 (see FIG. 1) sends the index(es) determined in step 306 (e.g., as a list) to recipient computer system 151 (see FIG. 1). Subsequent to step 308 and prior to step 310, recipient computer system 151 (see FIG. 1) receives the index(es) sent by monitoring module 118 (see FIG. 1).

In step 310, monitoring module 118 (see FIG. 1) or another software-based module executing in sender computer system 101 (see FIG. 1) deletes the one or more data entries in sender hash table 122 (see FIG. 1) that correspond to the index(es) determined in step 306. Also in step 310, a software-based module executing in recipient computer system 151 (see FIG. 1) deletes the one or more data entries in recipient hash table 172 (see FIG. 1) that correspond to the index(es) sent in step 306 and subsequently received by recipient computer system 151 (see FIG. 1).

In step 312, monitoring module 118 (see FIG. 1) re-determines the available space in sender hash table 122 (see FIG. 1).

In step 314, monitoring module 118 (see FIG. 1) determines whether the available space in sender hash table 122 (see FIG. 1) is still less than the available space threshold value. If monitoring module 118 (see FIG. 1) determines in step 314 that the available space is less than the available space threshold value, then the Yes branch of step 314 is taken and the process of FIG. 3 loops back to step 306 to determine index(es) of one or more other hash table data entries that are to be deleted to increase the available space in sender hash table 122 (see FIG. 1) and recipient hash table 172 (see FIG. 1). Otherwise, if monitoring module 118 (see FIG. 1) determines in step 314 that the available space is greater than or equal to the available space threshold value, then the No branch of step 314 is taken and step 316 is performed. The process of FIG. 3 ends at step 316.

For example, consider sender hash table 122 (see FIG. 1) having the following usage counts in rows 1 through 10, respectively: 1, 2, 1, 5, 2, 4, 5, 2, 4, 4 (i.e., the first row has a usage count of 1, the second row has a usage count of 2, the third row has a usage count of 1, and so on, up to the tenth row has a usage count of 4). In this example, the first performance of step 306 determines row numbers 1 and 3 are to be deleted to increase the available space in sender hash table 122 (see FIG. 1) and in recipient hash table 172 (see FIG. 1) because the lowest usage count is 1 and the first and third rows have the lowest usage count of 1. After deleting row numbers 1 and 3 in step 310, if step 314 determines that the available space is still less than the threshold value, then a second performance of step 306 determines row numbers 2, 5 and 8 are to be deleted because 2 is the next lowest usage count after the usage count of 1 that was used in the first performance of step 306, and because the second, fifth and eighth rows have the next lowest count of 2. After deleting the second fifth and eight rows, if step 314 determines that the available space is still less than the threshold value, then a third performance of step 306 determines row numbers 6, 9 and 10 are to be deleted because the next lowest count is 4 after the usage count of 2 was used in the second performance of step 306, and because the sixth, ninth and tenth rows have the next lowest count of 4.

EXAMPLE

Figure 4:
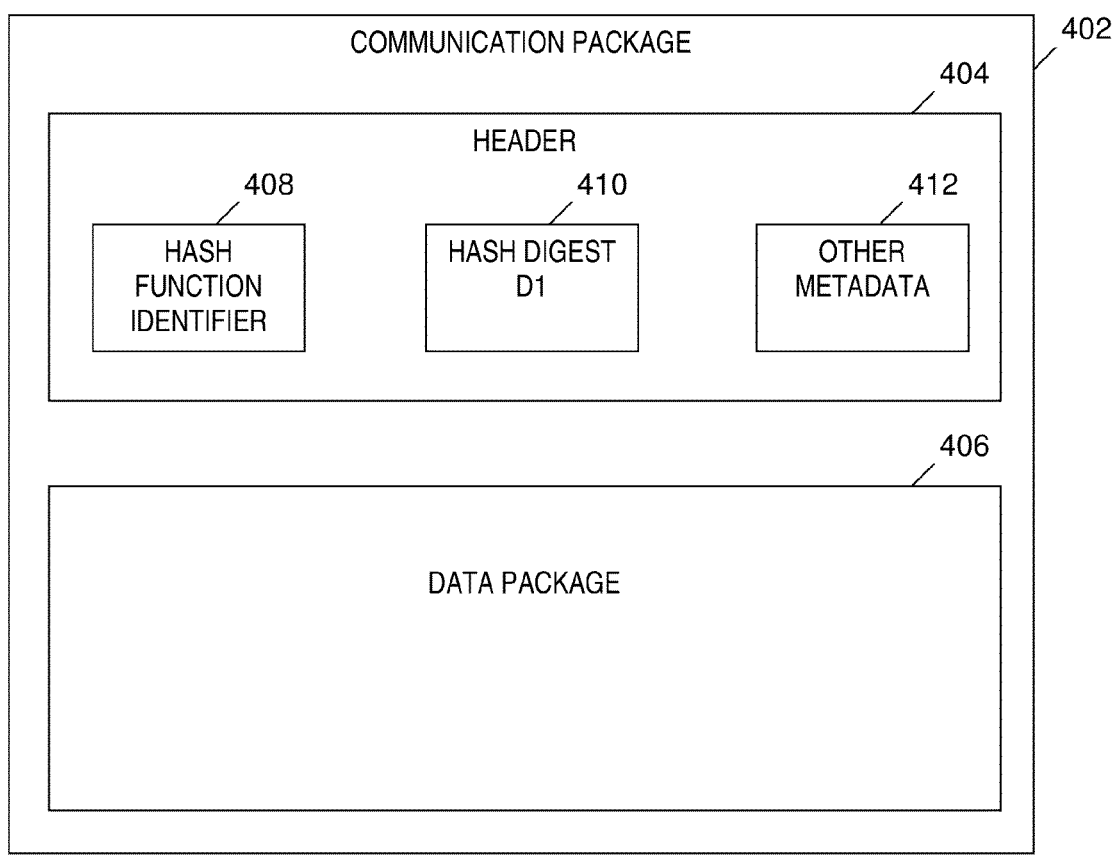
FIG. 4 is an exemplary communication packet that includes a data package managed by the process of FIGS. 2A-2B, in accordance with embodiments of the present invention.

FIG. 4 is an exemplary communication packet that includes a data package managed by the process of FIGS. 2A-2B, in accordance with embodiments of the present invention. A communication package 402 includes a header 404 and a data package 406. Header 404 includes a hash function identifier 408, a hash digest D1 410 and other metadata 412. Communication package 402 is an extension of known communication packages in that header 404 includes the additional metadata of hash function identifier 408 and hash digest D1 410. Known metadata is included in other metadata 412.

Communication package 402 is an example of the communication package sent in step 218 (see FIG. 2A) or step 228 (see FIG. 2B). Hash function identifier 408 is an exemplary identifier of the hash function selected in step 210 (see FIG. 2A) or step 212 (see FIG. 2A). See Table 1 for examples of available hash functions. Data package 406 is an example of the data package for which the hash digest D1 is determined in step 214 (see FIG. 2A), which is sent to second computer system 151 (see FIG. 1) in step 218 (see FIG. 2A) or step 228 (see FIG. 2B), and which is sent to an application in step 244 (see FIG. 2B). Hash digest D1 410 is an example of the hash digest determined in step 214 (see FIG. 2A) and which is sent to recipient computer system 151 (see FIG. 1) in 218 (see FIG. 2A) or step 228 (see FIG. 2B).

A variation of communication package 402 that does not include data package 406 or that includes no data in data package 406 is an example of the communication package sent in step 224 (see FIG. 2B). If communication package 402 is sent in step 224 (see FIG. 2B), then hash digest D1 410 includes the hash digest D1 determined in step 214 (see FIG. 2A) and other metadata 412 includes the index that is sent in step 224 (see FIG. 2B).

Computer System

FIG. 5 is a block diagram of a computer system that implements the processes of FIGS. 2A-2B and FIG. 3, in accordance with embodiments of the present invention. System 500 includes a first computer system 101-1 and a second computer system 151-1 in communication with each other via a computer network 130-1.

First computer system 101-1 generally comprises a central processing unit (CPU) 102-1, a memory 104-1, an input/output (I/O) interface 106-1, a bus 108-1, and a sender NIC 116-1. Further, computer system 101-1 is coupled to I/O devices 110-1 and a computer data storage unit 112-1. Similarly, computer system 151-1 generally comprises a CPU 152-1, a memory 154-1, an I/O interface 156-1, a bus 158-1, and a recipient NIC 166-1, and computer system 151-1 is coupled to I/O devices 160-1 and a computer data storage unit 162-1.

CPU 102-1 and 152-1 perform computation and control functions of computer system 101-1 and 151-1, respectively, including CPU 102-1 carrying out instructions included in monitoring program code 518 and deduplication program code 520, and CPU 152-1 carrying out instructions included in reduplication program code 568 to perform a method of managing a data package using a sender hash table 522 in memory 104-1 and a recipient hash table 572 in memory 154-1. The instructions included in code 518 and 520 are carried out by CPU 102-1 via memory 104-1. The instructions included in code 518 and 520 are carried out by CPU 102-1 via memory 104-1. The instructions included in code 568 are carried out by CPU 152-1 via memory 154-1. CPU 102-1 and CPU 152-1 may each comprise a single processing unit, or be distributed across one or more processing units in one or more locations (e.g., on a client and server).

In another embodiment, computer system 101-1 also includes reduplication program code whose functionality matches the functionality of reduplication program code 568, and computer system 151-1 also includes monitoring program code and deduplication program code whose functionality matches the functionality of monitoring program code 518 and deduplication program code 520, respectively.

Memory 104-1 and memory 154-1 may each include any known computer-readable storage medium, which is described below. In one embodiment, cache memory elements of memory 104-1 and memory 154-1 provide temporary storage of at least some program code (e.g., program code 518 and program code 520) in order to reduce the number of times code must be retrieved from bulk storage while instructions of the program code are carried out. Moreover, memory 104-1 and memory 154-1 may each reside at a respective single physical location, comprising one or more types of data storage, or be distributed across a plurality of physical systems in various forms. Further, memory 104-1 and memory 154-1 can each include data distributed across, for example, a local area network (LAN) or a wide area network (WAN).

I/O interface 106-1 and I/O interface 156-1 each include any system for exchanging information to or from an external source. I/O devices 110-1 and I/O devices 160-1 include any known type of external device, including a display device (e.g., monitor), keyboard, mouse, printer, speakers, handheld device, facsimile, etc. Bus 108-1 and bus 158-1 provide a communication link between each of the components in first computer system 101-1 and second computer system 151-1, respectively, and may each comprise any type of transmission link, including electrical, optical, wireless, etc.

I/O interface 106-1 and I/O interface 156-1 also allow computer system 101-1 and computer system 151-1, respectively, to store information (e.g., data or program instructions such as program code 518 and program code 520) on and retrieve the information from computer data storage unit 112-1 and computer data storage unit 162-1, respectively, or another computer data storage unit (not shown). Computer data storage unit 112-1 and computer data storage unit 162-1 may each comprise any known computer-readable storage medium, which is described below. For example, computer data storage unit 112-1 or computer data storage unit 162-1 may be a non-volatile data storage device, such as a magnetic disk drive (i.e., hard disk drive) or an optical disc drive (e.g., a CD-ROM drive which receives a CD-ROM disk).

Sender NIC 116-1 is a component that connects first computer system 101-1 to network 130-1. Recipient NIC 166-1 is a component that connects second computer system 151-1 to network 130-1.

Memory 104-1 and/or storage unit 112-1 may store computer program code 518 and program code 520 that include instructions that are carried out by CPU 102-1 via memory 104-1 to manage a data package. Memory 154-1 and/or storage unit 162-1 may store computer program code 568 that includes instructions that are carried out by CPU 152-1 via memory 154-1 to manage a data package. Although FIG. 5 depicts memory 104-1 as including program code 518 and program code 520, the present invention contemplates embodiments in which memory 104-1 does not include all of code 518 and code 520 simultaneously, but instead at one time includes only a portion of code 518 and/or a portion of code 520. Although FIG. 5 depicts memory 154-1 as including program code 568, the present invention contemplates embodiments in which memory 154-1 does not include all of code 568 simultaneously, but instead at one time includes only a portion of code 568.

Further, memory 104-1 and memory 154-1 may include other systems not shown in FIG. 5, such as, respectively, an operating system that runs on CPU 102-1 and provides control of various components within and/or connected to computer system 101-1, and an operating system that runs on CPU 152-1 and provides control of various components within and/or connected to computer system 151-1.

In one embodiment, storage unit 112-1 and/or one or more other computer data storage units (not shown) that are coupled to computer system 101-1 stores sender hash table 522. In one embodiment, storage unit 162-1 and/or one or more other computer data storage units (not shown) that are coupled to computer system 151-1 stores recipient hash table 572.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 104-1 and/or computer data storage unit 112-1; e.g., memory 154-1 and/or computer data storage unit 162-1) having computer-readable program code (e.g., program code 518 and 520; e.g., program code 568) embodied or stored thereon.

Any combination of one or more computer-readable mediums (e.g., memory 104-1 and computer data storage unit 112-1; e.g., memory 154-1 and/or computer data storage unit 162-1) may be utilized. The computer readable medium may be a computer-readable storage medium or a computer-readable signal medium. In one embodiment, the computer-readable storage medium is a computer-readable storage device or computer-readable storage apparatus. A computer-readable storage medium may be, for example, but not limited to, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a tangible medium that can contain or store a program (e.g., program 518 and 520; e.g., program 568) for use by or in connection with a system, apparatus, or device for carrying out instructions. However, the terms "computer-readable storage medium" and "computer-readable storage device" do not encompass a propagation medium.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 518, 520 and 568) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 518, 520 and 568) for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 101-1, computer system 151-1 or another computer system (not shown) having components analogous to the components of computer system 101-1 or computer system 151-1 included in FIG. 5. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B and FIG. 3) and/or block diagrams of methods, apparatus (systems) (e.g., FIG. 1 and FIG. 5), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 518, 520 and 568). These computer program instructions may be provided to one or more hardware processors (e.g., CPU 102-1 or CPU 152-1) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable device (e.g., memory 104-1 or computer data storage unit 112-1; e.g., memory 154-1 or computer data storage unit 162-1) that can direct a computer (e.g., computer system 101-1 or computer system 151-1), other programmable data processing apparatus, or other devices to function in a particular manner, such that the instructions (e.g., program code 518 and 520; e.g., program code 568) stored in the computer-readable device produce an article of manufacture including instructions which implement the function/act specified in the flowchart and/or block diagram block or blocks.

The computer program instructions may also be loaded onto a computer (e.g., computer system 101-1 or computer system 151-1), other programmable data processing apparatus, or other devices to cause a series of operational steps to be performed on the computer, other programmable apparatus, or other devices to produce a computer implemented process such that the instructions (e.g., program code 518 and 520; e.g., program code 568) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to managing a data package. Thus, an embodiment of the present invention discloses a process for supporting computer infrastructure, wherein the process includes a first computer system providing at least one support service for at least one of integrating, hosting, maintaining and deploying computer-readable code (e.g., program code 518 and 520; e.g., program code 568) in a second computer system (e.g., computer system 101-1 or computer system 151-1) including one or more processors (e.g., CPU 102-1 or CPU 152-1), wherein the processor(s) carry out instructions contained in the code causing the second computer system to manage a data package.

In another embodiment, the invention provides a method that performs the process steps of the invention on a subscription, advertising and/or fee basis. That is, a service provider, such as a Solution Integrator, can offer to create, maintain, support, etc. a process of managing a data package. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2B and FIG. 3 and the block diagrams in FIG. 1 and FIG. 5 illustrate the architecture, functionality, and operation of possible implementations of systems, methods, and computer program products according to various embodiments of the present invention. In this regard, each block in the flowchart or block diagrams may represent a module, segment, or portion of code (e.g., program code 518 and 520; e.g., program code 568), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Returning to FIG. 1, in one embodiment, first computer system 101 is coupled to I/O devices (not shown) and a computer data storage unit (not shown), where the I/O devices and computer data storage unit have the functionality of I/O devices 110-1 (see FIG. 5) and computer data storage unit 112-1 (see FIG. 5), respectively. In one embodiment, second computer system 151 is coupled to I/O devices (not shown) and a computer data storage unit (not shown), where the I/O devices and computer data storage unit have the functionality of I/O devices 160-1 (see FIG. 5) and computer data storage unit 162-1 (see FIG. 5), respectively.

CPU 102 performs computation and control functions of first computer system 101, including carrying out instructions included in program code that includes monitoring module 118 and deduplication module 120 to perform a method of managing a data package. In one embodiment, the instructions included in monitoring module 118 and deduplication module 120 are carried out by a processor (not shown) in sender NIC 116 via a memory (not shown) in sender NIC 116, or by CPU 102 via memory 104. In another embodiment, the instructions included in monitoring module 118 and deduplication module 120 are carried out by CPU 102 via memory 104.

CPU 152 performs computation and control functions of second computer system 151, including carrying out instructions included in program code that includes reduplication module 168 to perform a method of managing a data package. In one embodiment, the instructions included in reduplication module 168 are carried out by a processor (not shown) in recipient NIC 166 via a memory (not shown) in recipient NIC 166. In another embodiment, the instructions included in reduplication module 168 are carried out by CPU 152 via memory 154.

CPU 102 and CPU 152 may each include a single processing unit, or be distributed across one or more processing units in one or more locations (e.g., on a client and server).

Memory 104 and memory 154 may each include any known computer-readable storage medium, which is described above. Memory 104 and memory 154 have the features and limitations of memory 104-1 (see FIG. 5) and memory 154-1 (see FIG. 5), respectively, as described above.

In one embodiment, the functionality of monitoring module 118 is equivalent to the functionality of monitoring program code 518 (see FIG. 5), the functionality of deduplication module 120 is equivalent to the functionality of deduplication program code 520 (see FIG. 5), the functionality of sender hash table 122 is equivalent to the functionality of sender hash table 522 (see FIG. 5), the functionality reduplication module 168 is equivalent to the functionality of reduplication program code 568, and the functionality of recipient hash table 172 is equivalent to the functionality of recipient hash table 572 (see FIG. 5).

In an alternate embodiment, the steps in FIGS. 2A-2B and in FIG. 3 that are performed by monitoring module 118, deduplication module 120 and reduplication module 168 are instead performed by computer system 101-1 executing monitoring program code 518 (see FIG. 5), computer system 101-1 executing deduplication program code 520 (see FIG. 5), and computer system 151-1 executing reduplication program code 568 (see FIG. 5), respectively.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a data package, the method comprising the steps of:
a first computer determining a utilization of a network is greater than a network utilization threshold, the network including the first computer and a second computer; and
based on the utilization of the network being greater than the network utilization threshold, the first computer entering a deduplication mode and subsequently performing steps in the deduplication mode that include:
the first computer sending a notification to the second computer that the first computer has entered the deduplication mode;
the first computer determining whether a utilization of a central processing unit (CPU) included in the first computer is greater than a CPU utilization threshold;
the first computer selecting a first hash function instead of a second hash function if the utilization of the CPU is greater than the CPU utilization threshold, and selecting the second hash function instead of the first hash function if the utilization of the CPU is less than or equal to the CPU utilization threshold;
the first computer determining a hash digest of the data package by utilizing the selected first or second hash function;
the first computer determining whether the hash digest is in a sender hash table coupled to the first computer;
if the hash digest is in the sender hash table, then without the first computer sending the data package to the second computer, the first computer sending to the second computer the hash digest, an index referring to the hash digest in the sender hash table and in a recipient hash table coupled to the second computer, and optionally an identifier of the selected first or second hash function; and
if the hash digest is not in the sender hash table, then the first computer adding the data package and the hash digest to the sender hash table and sending the data package, the hash digest, and the identifier of the selected first or second hash function to the second computer to determine whether the data package has integrity based on the hash digest.

2. The method of claim 1, further comprising the second computer receiving the notification that the first computer has entered the deduplication mode, wherein the first computer determines the hash digest is in the sender hash table and the first computer sends to the second computer the hash digest, the index referring to the hash digest in the sender hash table and in the recipient hash table, and the identifier of the selected first or second hash function, and in response:
based on the received notification that the first computer has entered the deduplication mode, the second computer determining the data package is not received along with the hash digest, the index, and the identifier;
the second computer receiving the hash digest, the index, and the identifier of the selected first or second hash function;
in response to the second computer determining the data package is not received and based on the index, the second computer locating the hash digest in the recipient hash table;
the second computer determining the hash digest located in the recipient hash table matches the received hash digest;

based on the located hash digest matching the received hash digest, the second computer retrieving the data package associated with the located hash digest in the recipient hash table;

based on the received identifier, the second computer determining the selected first or second hash function and determining a new hash digest by utilizing the selected first or second hash function on the retrieved data package;

the second computer determining whether the new hash digest matches the received hash digest; and if the new hash digest matches the received hash digest, the second computer passing the retrieved data package to an application.

3. The method of claim 1, wherein the first computer determines the hash digest is not in the sender hash table, and wherein the method further comprises the steps of:

subsequent to the step of determining the hash digest is not in the sender hash table, the first computer embedding the hash digest and the identifier of the selected first or second hash function in metadata included in a communication package, embedding the data package in the communication package, and sending the communication package to the second computer;

in response to the step of the first computer sending the communication package to the second computer, the second computer receiving the hash digest, the identifier of the selected first or second hash function, and the data package by receiving the communication package;

based on the received identifier of the selected first or second hash function, the second computer determining a new hash digest by utilizing the selected first or second hash function on the received data package; and the second computer determining whether the received hash digest matches the new hash digest, and if the received hash digest matches the new hash digest, then the second computer determining the data package has integrity, and in response, the second computer adding the data package and the hash digest to the recipient hash table and passing the data package to an application, and if the received hash digest does not match the new hash digest, then the second computer notifying the first computer that the data package does not have integrity, and in response, the first computer re-sending the data package and the hash digest to the second computer.

4. The method of claim 3, wherein the second computer determines the received hash digest matches the new hash digest and the second computer adds the data package and the hash digest to the recipient hash table, and wherein the method further comprises:

subsequent to the first computer adding the data package and the hash digest to the sender hash table, subsequent to the second computer adding the data package and the hash digest to the recipient hash table, based on the data package being added to the sender hash table, and without the first computer sending the data package to the second computer, the first computer sending to the second computer a second hash digest and the index referring to the hash digest in the sender hash table and in the recipient hash table;

the second computer receiving the second hash digest and the index sent by the first computer;

based on the index, the second computer locating the hash digest in the recipient hash table;

the second computer determining the hash digest located in the recipient hash table matches the received second hash digest;

based on the located hash digest matching the received second hash digest, the second computer retrieving the data package associated with the located hash digest in the recipient hash table;

based on the received identifier of the selected first or second hash function, the second computer determining the selected first or second hash function and determining a second new hash digest by utilizing the selected first or second hash function on the retrieved data package associated with the located hash digest in the recipient hash table;

the second computer determining whether the second new hash digest matches the received second hash digest; and if the second new hash digest matches the received second hash digest, the second computer passing the retrieved data package to the application.

5. The method of claim 1, wherein the first computer determines the hash digest is in the sender hash table and in response, the first computer updating a count included in a plurality of counts in the sender hash table, the count indicating how many times the first computer sends the index and the hash digest of the data package to any other computer in the network, and wherein the method further comprises the steps of:

the first computer repeating the steps in the deduplication mode for other data packages;

the first computer updating other counts included in the plurality of counts in the sender hash table, the other counts indicating how many times the first computer sends other indexes and other hash digests of the other data packages to any other computer in the network;

during the deduplication mode, the first computer determining a space available in the sender hash table;

the first computer determining the space available in the sender hash table is less than a space threshold;

based on the space available in the sender hash table being less than the space threshold, the first computer determining one or more indexes of the sender hash table that refer to a lowest count included in the plurality of counts in the sender hash table;

the first computer deleting one or more entries in the sender hash table that correspond to the one or more indexes and include the lowest count so that the space available in the sender hash table exceeds the space threshold; and the first computer sending the one or more indexes that refer to the lowest count to the second computer.

6. The method of claim 5, further comprising the steps of:

the second computer receiving from the first computer the one or more indexes that refer to the lowest count; and the second computer deleting one or more entries in the recipient hash table that correspond to the one or more indexes and include the lowest count, so that space available in the recipient hash table changes from being less than the space threshold to exceeding the space threshold.

7. A first computer system comprising:
a central processing unit (CPU);
a memory coupled to the CPU;
a computer-readable, tangible storage device coupled to the CPU, the storage device containing instructions that are carried out by the CPU via the memory to implement a method of managing a data package, the method comprising the steps of:

the first computer system determining a utilization of a network is greater than a network utilization threshold, the network including the first computer system and a second computer system; and based on the utilization of the network being greater than the network utilization threshold, the first computer system entering a deduplication mode and subsequently performing steps in the deduplication mode that include:

the first computer system sending a notification to the second computer system that the first computer system has entered the deduplication mode;

the first computer system determining whether a utilization of the CPU included in the first computer system is greater than a CPU utilization threshold;

the first computer system selecting a first hash function instead of a second hash function if the utilization of the CPU is greater than the CPU utilization threshold, and selecting the second hash function instead of the first hash function if the utilization of the CPU is less than or equal to the CPU utilization threshold;

the first computer system determining a hash digest of the data package by utilizing the selected first or second hash function;

the first computer system determining whether the hash digest is in a sender hash table coupled to the first computer system;

if the hash digest is in the sender hash table, then without the first computer system sending the data package to the second computer system, the first computer system sending to the second computer system the hash digest, an index referring to the hash digest in the sender hash table and in a recipient hash table coupled to the second computer system, and optionally an identifier of the selected first or second hash function; and if the hash digest is not in the sender hash table, then the first computer system adding the data package and the hash digest to the sender hash table and sending the data package, the hash digest, and the identifier of the selected first or second hash function to the second computer system to determine whether the data package has integrity based on the hash digest.

8. The first computer system of claim 7, wherein a result of the first computer system sending the notification that the first computer system has entered the deduplication mode is a receipt by the second computer of the notification, wherein the first computer system determines the hash digest is in the sender hash table and the first computer system sends to the second computer system the hash digest, the index referring to the hash digest in the sender hash table and in the recipient hash table, and the identifier of the selected first or second hash function, and wherein a result of the step of the first computer system sending to the second computer system the hash digest, the index, and the identifier includes:

based on the receipt of the notification that the first computer system has entered the deduplication mode, a determination by the second computer system that the data package is not received along with the hash digest, the index, and the identifier;

a receipt of the hash digest, the index, and the identifier of the selected first or second hash function at the second computer system;

a location by the second computer system of the hash digest in the recipient hash table based on the index and responsive to the determination by the second computer system that the data package is not received;

a determination by the second computer system that the hash digest located in the recipient hash table matches the received hash digest;

based on the located hash digest matching the received hash digest, a retrieval by the second computer system of the data package associated with the located hash digest in the recipient hash table;

based on the receipt of the identifier, a determination of the selected first or second hash function by the second computer system, and a determination of a new hash digest by a utilization of the selected first or second hash function on the retrieved data package by the second computer system;

a determination by the second computer system of whether the new hash digest matches the received hash digest; and if the new hash digest matches the received hash digest, a passing of the retrieved data package to an application by the second computer system.

9. The first computer system of claim 7, wherein the first computer system determines the hash digest is not in the sender hash table, and wherein the method further comprises the steps of:

subsequent to the step of determining the hash digest is not in the sender hash table, the first computer system embedding the hash digest and the identifier of the selected first or second hash function in metadata included in a communication package, embedding the data package in the communication package, and sending the communication package to the second computer system, wherein a result of the step of sending the communication package to the second computer system includes:

a receipt of the hash digest, the identifier of the selected first or second hash function, and the data package by the second computer system;

based on the received identifier of the selected first or second hash function, a determination of a new hash digest by a utilization of the selected first or second hash function on the received data package; and a determination of whether the received hash digest matches the new hash digest, and if the received hash digest matches the new hash digest, then the result includes a determination that the data package has integrity, an addition of the data package and the hash digest to the recipient hash table, and a passing of the data package to an application, and if the received hash digest does not match the new hash digest, then the result includes a notification of the first computer system that the data package does not have integrity, and in response, the first computer system re-sending the data package and the hash digest to the second computer system.

10. The first computer system of claim 9, wherein the result of the step of sending the communication package to the second computer system further includes the determination that the received hash digest matches the new hash digest and the addition of the data package and the hash digest to the recipient hash table, and wherein the method further comprises:

subsequent to the first computer system adding the data package and the hash digest to the sender hash table, subsequent to the addition of the data package and the hash digest to the recipient hash table, based on the data package being added to the sender hash table, and without the first computer system sending the data package to the second computer system, the first computer system sending to the second computer system a second hash digest and the index referring to the hash digest in the sender hash table and in the recipient hash table, wherein a result of the step of the first computer system sending the data package to the second computer system includes:

a receipt of the second hash digest and the index sent by the first computer system;

based on the index, a location of the hash digest in the recipient hash table;

a determination that the hash digest located in the recipient hash table matches the received second hash digest;

based on the located hash digest matching the received second hash digest, a retrieval of the data package associated with the located hash digest in the recipient hash table;

based on the received identifier of the selected first or second hash function, a determination of the selected first or second hash function, and a determination of a second new hash digest by a utilization of the selected first or second hash function on the retrieved data package associated with the located hash digest in the recipient hash table;

a determination of whether the second new hash digest matches the received second hash digest; and if the second new hash digest matches the received second hash digest, a passing of the retrieved data package to the application.

11. A computer program product, comprising:

a computer-readable, tangible storage device; and a computer-readable program code stored in the computer-readable, tangible storage device, the computer-readable program code containing instructions that are carried out by a central processing unit (CPU) of a first computer system to implement a method of managing a data package, the method comprising the steps of:

the first computer system determining a utilization of a network is greater than a network utilization threshold, the network including the first computer system and a second computer system; and based on the utilization of the network being greater than the network utilization threshold, the first computer system entering a deduplication mode and subsequently performing steps in the deduplication mode that include:

the first computer system sending a notification to the second computer system that the first computer system has entered the deduplication mode;

the first computer system determining whether a utilization of the CPU included in the first computer system is greater than a CPU utilization threshold;

the first computer system selecting a first hash function instead of a second hash function if the utilization of the CPU is greater than the CPU utilization threshold, and selecting the second hash function instead of the first hash function if the utilization of the CPU is less than or equal to the CPU utilization threshold;

the first computer system determining a hash digest of the data package by utilizing the selected first or second hash function;

the first computer system determining whether the hash digest is in a sender hash table coupled to the first computer system;

if the hash digest is in the sender hash table, then without the first computer system sending the data package to the second computer system, the first computer system sending to the second computer system the hash digest, an index referring to the hash digest in the sender hash table and in a recipient hash table coupled to the second computer system, and optionally an identifier of the selected first or second hash function; and if the hash digest is not in the sender hash table, then the first computer system adding the data package and the hash digest to the sender hash table and sending the data package, the hash digest, and the identifier of the selected first or second hash function to the second computer system to determine whether the data package has integrity based on the hash digest.

12. The program product of claim 11, wherein a result of the first computer system sending the notification that the first computer system has entered the deduplication mode is a receipt by the second computer system of the notification, wherein the first computer system determines the hash digest is in the sender hash table and the first computer system sends to the second computer system the hash digest, the index referring to the hash digest in the sender hash table and in the recipient hash table, and the identifier of the selected first or second hash function, and wherein a result of the step of the first computer system sending to the second computer system the hash digest, the index, and the identifier includes:

based on the receipt of the notification that the first computer system has entered the deduplication mode, a determination by the second computer system that the data package is not received along with the hash digest, the index, and the identifier;

a receipt of the hash digest, the index, and the identifier of the selected first or second hash function at the second computer system;

a location by the second computer system of the hash digest in the recipient hash table based on the index and responsive to the determination by the second computer system that the data package is not received;

a determination by the second computer system that the hash digest located in the recipient hash table matches the received hash digest;

based on the located hash digest matching the received hash digest, a retrieval by the second computer system of the data package associated with the located hash digest in the recipient hash table;

based on the receipt of the identifier, a determination of the selected first or second hash function by the second computer system, and a determination of a new hash digest by a utilization of the selected first or second hash function on the retrieved data package by the second computer system;

a determination by the second computer system of whether the new hash digest matches the received hash digest; and if the new hash digest matches the received hash digest, a passing of the retrieved data package to an application by the second computer system.

13. The program product of claim 11, wherein the first computer system determines the hash digest is not in the sender hash table, and wherein the method further comprises the steps of:

subsequent to the step of determining the hash digest is not in the sender hash table, the first computer system embedding the hash digest and the identifier of the selected first or second hash function in metadata included in a communication package, embedding the data package in the communication package, and sending the communication package to the second computer system, wherein a result of the step of sending the communication package to the second computer system includes:
a receipt of the hash digest, the identifier of the selected first or second hash function, and the data package by the second computer system;
based on the received identifier of the selected first or second hash function, a determination of a new hash digest by a utilization of the selected first or second hash function on the received data package; and
a determination of whether the received hash digest matches the new hash digest, and if the received hash digest matches the new hash digest, then the result includes a determination that the data package has integrity, an addition of the data package and the hash digest to the recipient hash table, and a passing of the data package to an application, and if the received hash digest does not match the new hash digest, then the result includes a notification of the first computer system that the data package does not have integrity, and in response, the first computer system re-sending the data package and the hash digest to the second computer system.

14. The program product of claim 13, wherein the result of the step of sending the communication package to the second computer system further includes the determination that the received hash digest matches the new hash digest and the addition of the data package and the hash digest to the recipient hash table, and wherein the method further comprises:
subsequent to the first computer system adding the data package and the hash digest to the sender hash table, subsequent to the addition of the data package and the hash digest to the recipient hash table, based on the data package being added to the sender hash table, and without the first computer system sending the data package to the second computer system, the first computer system sending to the second computer system a second hash digest and the index referring to the hash digest in the sender hash table and in the recipient hash table,
wherein a result of the step of the first computer system sending the data package to the second computer system includes:
a receipt of the second hash digest and the index sent by the first computer system;
based on the index, a location of the hash digest in the recipient hash table;
a determination that the hash digest located in the recipient hash table matches the received second hash digest;
based on the located hash digest matching the received second hash digest, a retrieval of the data package associated with the located hash digest in the recipient hash table;
based on the received identifier of the selected first or second hash function, a determination of the selected first or second hash function, and a determination of a second new hash digest by a utilization of the selected first or second hash function on the retrieved data package associated with the located hash digest in the recipient hash table;
a determination of whether the second new hash digest matches the received second hash digest; and
if the second new hash digest matches the received second hash digest, a passing of the retrieved data package to the application.

15. A process for supporting computing infrastructure, the process comprising the step of:
providing at least one support service for at least one of creating, integrating, hosting, maintaining, and deploying computer-readable code in a first computer system, the computer-readable code containing instructions, wherein the instructions, when carried out by a processor of the first computer system, implement a method of managing a data package, the method comprising the steps of:
the first computer system determining a utilization of a network is greater than a network utilization threshold, the network including the first computer system and a second computer system; and
based on the utilization of the network being greater than the network utilization threshold, the first computer system entering a deduplication mode and subsequently performing steps in the deduplication mode that include:
the first computer system sending a notification to the second computer system that the first computer system has entered the deduplication mode;
the first computer system determining whether a utilization of the CPU included in the first computer system is greater than a CPU utilization threshold;
the first computer system selecting a first hash function instead of a second hash function if the utilization of the CPU is greater than the CPU utilization threshold, and selecting the second hash function instead of the first hash function if the utilization of the CPU is less than or equal to the CPU utilization threshold;
the first computer system determining a hash digest of the data package by utilizing the selected first or second hash function;
the first computer system determining whether the hash digest is in a sender hash table coupled to the first computer system;
if the hash digest is in the sender hash table, then without the first computer system sending the data package to the second computer system, the first computer system sending to the second computer system the hash digest, an index referring to the hash digest in the sender hash table and in a recipient hash table coupled to the second computer system, and optionally an identifier of the selected first or second hash function; and
if the hash digest is not in the sender hash table, then the first computer system adding the data package and the hash digest to the sender hash table and sending the data package, the hash digest, and the identifier of the selected first or second hash function to the second computer system to determine whether the data package has integrity based on the hash digest.

16. The process of claim 15, wherein a result of the first computer system sending the notification that that first computer system has entered the deduplication mode is a receipt by the second computer system of the notification, wherein the first computer system determines the hash digest is in the sender hash table and the first computer system sends to the second computer system the hash digest, the index referring to the hash digest in the sender hash table and in the recipient hash table, and the identifier of the selected first or second hash function, and wherein a result of the step of the first computer system sending to the second computer system the hash digest, the index, and the identifier includes:
based on the receipt of the notification that the first computer system has entered the deduplication mode, a determination by the second computer system that the data package is not received along with the hash digest, the index, and the identifier;

a receipt of the hash digest, the index, and the identifier of the selected first or second hash function at the second computer system;

a location by the second computer system of the hash digest in the recipient hash table based on the index and responsive to the determination by the second computer system that the data package is not received;

a determination by the second computer system that the hash digest located in the recipient hash table matches the received hash digest;

based on the located hash digest matching the received hash digest, a retrieval by the second computer system of the data package associated with the located hash digest in the recipient hash table;

based on the receipt of the identifier, a determination of the selected first or second hash function by the second computer system, and a determination of a new hash digest by a utilization of the selected first or second hash function on the retrieved data package by the second computer system;

a determination by the second computer system of whether the new hash digest matches the received hash digest; and if the new hash digest matches the received hash digest, a passing of the retrieved data package to an application.

17. The process of claim 15, wherein the first computer system determines the hash digest is not in the sender hash table, and wherein the method further comprises the steps of:

subsequent to the step of determining the hash digest is not in the sender hash table, the first computer system embedding the hash digest and the identifier of the selected first or second hash function in metadata included in a communication package, embedding the data package in the communication package, and sending the communication package to the second computer system, wherein a result of the step of sending the communication package to the second computer system includes:

a receipt of the hash digest, the identifier of the selected first or second hash function, and the data package by the second computer system;

based on the received identifier of the selected first or second hash function, a determination of a new hash digest by a utilization of the selected first or second hash function on the received data package; and a determination of whether the received hash digest matches the new hash digest, and if the received hash digest matches the new hash digest, then the result includes an addition of the data package and the hash digest to the recipient hash table and a passing of the data package to an application, and if the received hash digest does not match the new hash digest, then the result includes a notification of the first computer system that the data package does not have integrity, and in response, the first computer system re-sending the data package and the hash digest to the second computer system.

18. A method of managing a data package, the method comprising a second computer performing steps in a reduplication mode, subsequent to:

a determination of a utilization of a network is greater than a network utilization threshold, the network including a first computer and the second computer;

an entering of a deduplication mode by the first computer;

a notification of the second computer by the first computer that the first computer has entered the deduplication mode;

a determination by a first computer whether a utilization of a CPU included in the first computer is greater than a CPU utilization threshold;

a selection of a first hash function instead of a second hash function if the utilization of the CPU is greater than the CPU utilization threshold;

a selection of the second hash function instead of the first hash function if the utilization of the CPU is less than or equal to the CPU utilization threshold, wherein a utilization of the first hash function uses the CPU less than a utilization of the second hash function;

a determination of a hash digest of the data package by a utilization of the selected first or second hash function;

a determination that the hash digest is in a sender hash table coupled to the first computer; and a sending by the first computer to the second computer of the hash digest, an index referring to the hash digest in the sender hash table and in a recipient hash table coupled to the second computer, and an identifier of the selected first or second hash function, without a sending of the data package to the second computer, wherein the steps in the reduplication mode include:

based on the notification of the second computer by the first computer that the first computer has entered the deduplication mode, the second computer determining the data package is not received along with the hash digest, the index, and the identifier;

the second computer receiving the hash digest, the index referring to the hash digest in the sender hash table and in the recipient hash table, and the identifier of the selected first or second hash function;

in response to the second computer determining the data package is not received and based on the index, the second computer locating the hash digest in the recipient hash table;

the second computer determining the hash digest located in the recipient hash table matches the received hash digest;

based on the located hash digest matching the received hash digest, the second computer retrieving the data package associated with the located hash digest from the recipient hash table;

based on the received identifier, the second computer determining the selected first or second hash function and determining a new hash digest by utilizing the selected first or second hash function on the retrieved data package;

the second computer determining whether the new hash digest matches the received hash digest; and if the new hash digest matches the received hash digest, the second computer passing the retrieved data package to an application.

19. The method of claim 18, further comprising the second computer performing additional steps in the reduplication mode subsequent to:

an update of a count included in a plurality of counts in the sender hash table, the count indicating how many times the first computer sends the index and the hash digest of the data package to any other computer in the network;

a repeat of the steps in the deduplication mode for other data packages;

an update of other counts included in the plurality of counts in the sender hash table, the other counts indicating how many times the first computer sends other indexes and other hash digests of the other data packages to any other computer in the network;
a determination during the deduplication mode of a space available in the sender hash table;
a determination that the space available in the sender hash table is less than a space threshold, based on the space available in the sender hash table being less than the space threshold;
a determination of one or more indexes of the sender hash table that refer to a lowest count included in the plurality of counts in the sender hash table;
a deletion of one or more entries in the sender hash table that correspond to the one or more indexes and include the lowest count so that the space available in the sender hash table exceeds the space threshold; and
a sending of the one or more indexes that refer to the lowest count to the second computer,
wherein the additional steps in the reduplication mode include:
  the second computer receiving from the first computer the one or more indexes that refer to the lowest count; and
  the second computer deleting one or more entries in the recipient hash table that correspond to the one or more indexes and include the lowest count, so that space available in the recipient hash table changes from being less than the space threshold to exceeding the space threshold.

20. A method of managing a data package, the method comprising the steps of:
a first computer determining a first utilization of a network is less than or equal to a network utilization threshold, the network including the first computer and a second computer;
based on the utilization of the network being less than or equal to the network utilization threshold, the first computer performing steps without being in a deduplication mode that include:
  the first computer determining whether a utilization of a CPU included in the first computer is greater than a CPU utilization threshold;
  the first computer selecting a first hash function instead of a second hash function if the utilization of the CPU is greater than the CPU utilization threshold, and selecting the second hash function instead of the first hash function if the utilization of the CPU is less than or equal to the CPU utilization threshold; and
  the first computer determining a hash digest of the data package by utilizing the selected first or second hash function;
based on the first computer performing the steps without being in deduplication mode, the first computer adding the hash digest to a sender hash table coupled to the first computer, and the first computer sending the data package, the hash digest, and an identifier of the selected first or second hash function to the second computer to determine whether the data package has integrity based on the hash digest,
wherein a result of the first computer sending the data package, the hash digest and the identifier of the selected first or second hash function to the second computer includes:
  a receipt by the second computer of the data package, the hash digest, and the identifier of the selected first or second hash function;
  based on the received identifier of the selected first or second hash function, a determination of a new hash digest by a utilization of the selected first or second hash function on the received data package; and
  a determination of whether the received hash digest matches the new hash digest, and if the received hash digest matches the new hash digest, then the result of the first computer sending the data package, the hash digest and the identifier includes a determination that data package has integrity, an addition of the data package and the hash digest to a recipient hash table coupled to the second computer, and a passing of the data package to an application, and if the received hash digest does not match the new hash digest, then the result of the first computer sending the data package, the hash digest and the identifier includes a notification of the first computer that the data package does not have integrity, and in response, a re-sending by the first computer of the data package and the hash digest to the second computer;
subsequent to the step of sending the data package, the hash digest and the identifier of the selected first or second hash function to the second computer, the first computer determining a second utilization of a network is greater than the network utilization threshold; and
based on the utilization of the network being greater than the network utilization threshold, the first computer entering the deduplication mode and subsequently performing steps in the deduplication mode that include:
  the first computer notifying the second computer that the first computer has entered the deduplication mode;
  the first computer determining a second hash digest of a second data package by utilizing the selected first or second hash function;
  the first computer determining the second hash digest of the second data package matches the hash digest added to the sender hash table; and
  based on the second hash digest of the second data package matching the hash digest added to the sender hash table, and without the first computer sending the data package to the second computer, the first computer sending to the second computer the second hash digest, an index referring to the hash digest added to the sender hash table, and the identifier of the selected first or second hash function,
  wherein a result of the first computer sending to the second computer the second hash digest, the index, and the identifier includes:
  based on the second computer being notified that the first computer has entered the deduplication mode, a determination by the second computer that the data package is not received along with the second hash digest, the index, and the identifier;
  a receipt by the second computer of the second hash digest, the index, and the identifier of the selected first or second hash function;
  in response to the determination that the data package is not received and based on the index, a location by the second computer of the hash digest added to the recipient hash table;
  a determination that the hash digest located in the recipient hash table matches the received second hash digest;
  based on the hash digest located in the recipient hash table matching the received second hash digest, a retrieval by the second computer of the data package associated with the hash digest located in the recipient hash table;

based on the receipt of the identifier, a determination of the selected first or second hash function by the second computer, and a determination of a second new hash digest by a utilization by the second computer of the selected first or second hash function on the retrieved data package associated with the hash digest located in the recipient hash table;

a determination by the second computer of whether the second new hash digest matches the received second hash digest; and if the second new hash digest matches the received second hash digest, a passing by the second computer of the retrieved data package to an application.

* * * * *